United States Patent
Vikramaratne et al.

(10) Patent No.: US 10,587,584 B2
(45) Date of Patent: Mar. 10, 2020

(54) SECURING SHARED DOCUMENTS USING DYNAMIC NATURAL LANGUAGE STEGANOGRAPHY

(71) Applicant: Box, Inc., Los Altos, CA (US)

(72) Inventors: Victor De Vansa Vikramaratne, Mountain View, CA (US); Justin Peng, Mountain View, CA (US); Minh-Tue Vo Thanh, San Francisco, CA (US); Josh Kline, Los Angeles, CA (US)

(73) Assignee: Box, Inc., Redwood City, CA (US)

(*) Notice: Subject to any disclaimer, the term of this patent is extended or adjusted under 35 U.S.C. 154(b) by 191 days.

(21) Appl. No.: 14/931,770

(22) Filed: Nov. 3, 2015

(65) Prior Publication Data
US 2017/0126631 A1 May 4, 2017

(51) Int. Cl.
*H04L 29/06* (2006.01)
*H04L 9/08* (2006.01)

(52) U.S. Cl.
CPC .......... *H04L 63/0428* (2013.01); *H04L 9/088* (2013.01); *H04L 9/0891* (2013.01); *H04L 9/0894* (2013.01); *H04L 63/102* (2013.01); *H04L 2209/608* (2013.01)

(58) Field of Classification Search
CPC .... H04L 63/0428; H04L 9/32; H04L 2209/16
USPC ......................................................... 713/170
See application file for complete search history.

(56) References Cited

U.S. PATENT DOCUMENTS

| | | | | |
|---|---|---|---|---|
| 2007/0244693 A1* | 10/2007 | Atallah | ................. | G06F 17/271 704/9 |
| 2011/0314550 A1* | 12/2011 | Mastrangelo | ......... | G06T 1/0021 726/26 |
| 2013/0236046 A1* | 9/2013 | Nallusamy | .............. | G06F 21/16 382/100 |

(Continued)

OTHER PUBLICATIONS

Topkara, Mercan, Cuneyt M. Taskiran, and Edward J. Delp. "Natural language watermarking." Security, Steganography, and Watermarking of Multimedia Contents 5681 (2005): 441-452.

(Continued)

*Primary Examiner* — Baotran N To
(74) *Attorney, Agent, or Firm* — Vista IP Law Group, LLP

(57) ABSTRACT

Systems for secure cloud-based collaboration over shared objects. Embodiments operate within systems in a cloud-based environment, wherein one or more servers are configured to interface with storage devices that store objects accessible by one or more users. A process receives an electronic message comprising a user request to access an object. Before providing user access to the object, the system generates a requestor-specific steganographic message that is derived from some portion of requestor identification information and/or other user attributes, and/or object storage parameters. Various forms of a requestor-specific steganographic message are applied to selected portions of the object to generate a requestor-specific protected object, which is then provided to the requestor. A web crawler can identify posted unauthorized protected object disclosures. Using quantitative calculations and/or heuristics together with requestor-specific aspects of the embedded steganographic message, the source of the unauthorized disclosure can be identified.

19 Claims, 16 Drawing Sheets

(56) References Cited

U.S. PATENT DOCUMENTS

| | | | |
|---|---|---|---|
| 2015/0095352 A1* | 4/2015 | Lacey | G06F 17/30011 |
| | | | 707/752 |
| 2015/0319403 A1* | 11/2015 | Antipa | H04M 1/72561 |
| | | | 386/224 |
| 2017/0075877 A1* | 3/2017 | Lepeltier | G06F 17/2705 |

OTHER PUBLICATIONS

Topkara, Mercan Karahan. New designs for improving the efficiency and resilience of natural language watermarking. Diss. Purdue University, 2007.

* cited by examiner

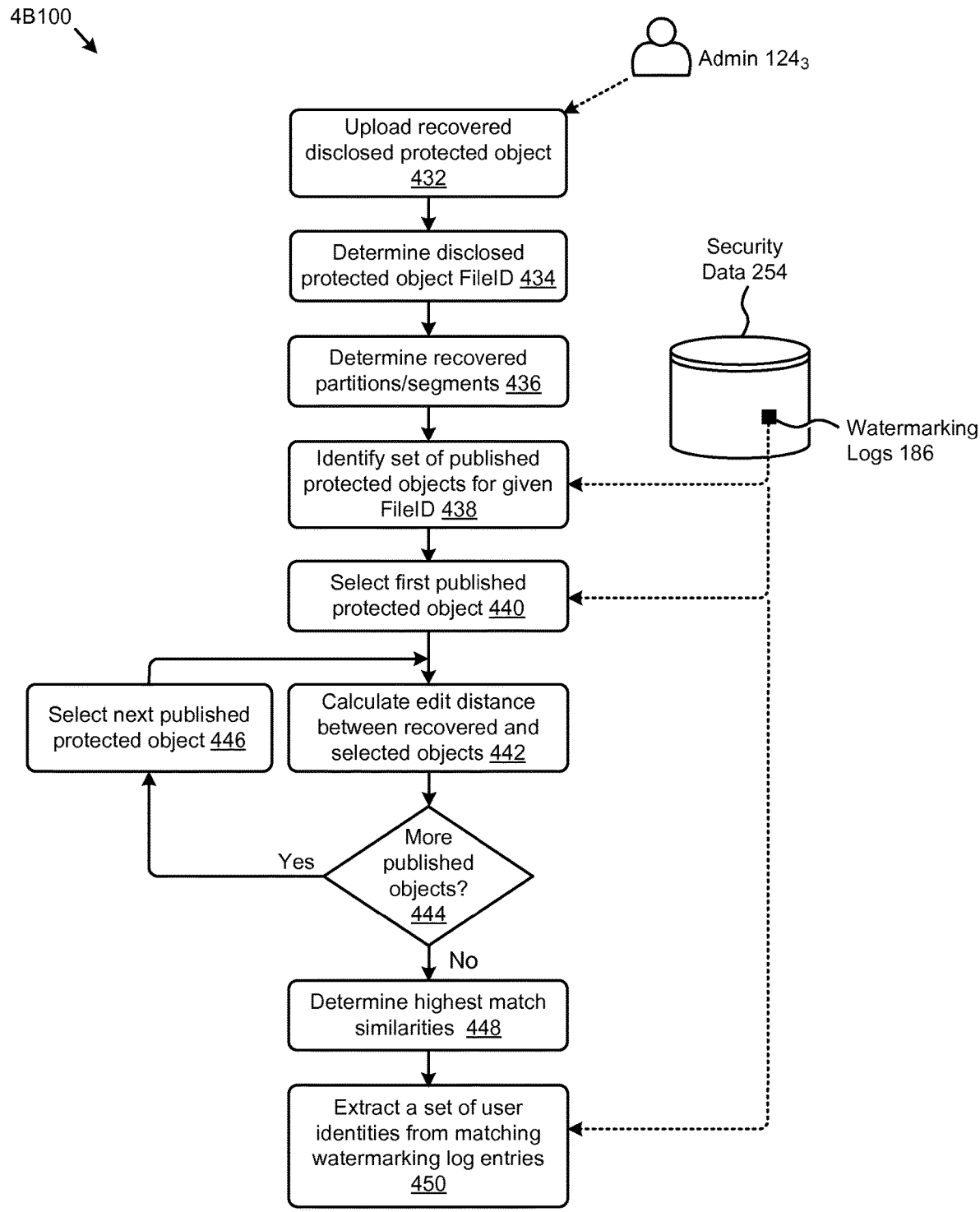
FIG. 4B1

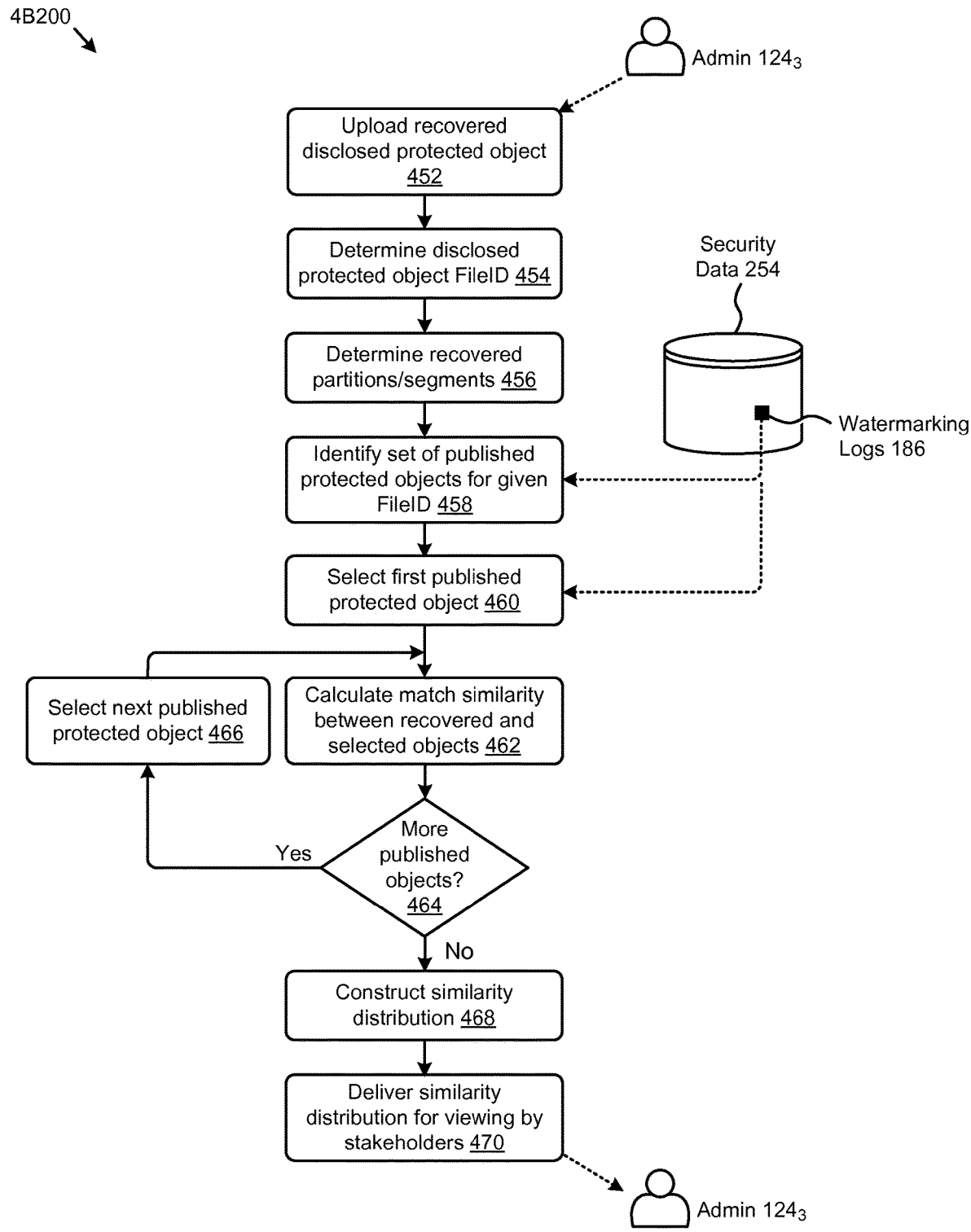
FIG. 4B2

SECURING SHARED DOCUMENTS USING DYNAMIC NATURAL LANGUAGE STEGANOGRAPHY

FIELD

This disclosure relates to cloud-based sharing and collaboration, and more particularly to techniques for securing shared documents using dynamic natural language steganography.

BACKGROUND

The proliferation of cloud-based services and platforms continues to increase. The advent of cloud-based shared content storage systems has impacted the way personal and corporate electronically stored information objects (e.g., files, images, videos, etc.) are stored, and has also impacted the way such personal and corporate content is shared and managed. One benefit of using such cloud-based systems is the ability to share secure content (e.g., movie scripts, financial statements, product specifications, etc.) for viewing and/or downloading between trusted viewers. In some cases, however, such secure content can be captured (e.g., downloaded, screen capture, manual copy, etc.) and disclosed (e.g., leaked) in an unauthorized manner. For example, a confidential, unreleased movie script might be available to certain trusted users for download, yet disclosure of the movie script to other individuals outside of the trusted group is prohibited. In some cases, one or more users might violate the restriction and disclose ("leak") the content to unauthorized parties—either maliciously or unintentionally. Such users or recipients might also modify the content (e.g., change words and/or sentences, crop certain portions, etc.). When the disclosed portion of the content is discovered, the content owners might want to determine the source of the unauthorized disclosure or leak.

Various legacy techniques have been implemented to provide security to documents. Some legacy techniques enable content owners (e.g., enterprises) to insert or overlay a watermark onto a document to visually indicate a level of security (e.g., "CONFIDENTIAL") and/or to indicate a level of authenticity (e.g., "OFFICIAL COPY"). Such techniques, however, do not provide a way to track the source (e.g., a user, viewer, non-owner, etc.) of unauthorized or illegal dissemination of the content. Further, watermarking documents primarily comprising text have little deterring effect since the cost of defeating the watermark is small relative to the value of the content. For example, a movie script that has significant potential value can be watermarked (e.g., as "Confidential—Do Not Copy"), but can be defeated by simply retyping the text in another document. In other legacy approaches, natural language processing (NLP) is used to make changes to the text of an object, yet without significantly impacting the meaning of the content. Such changes can be known to the object owner, yet not to the object user or viewer, such that the changes can serve as a watermark on the object. Such legacy approaches, however, use fixed algorithms determined by the object owners when applying the text changes, limiting the ability to determine the source of a leak. For example, using such legacy techniques, multiple users might receive the same watermarked text and/or certain users might modify the uniformly watermarked text so as to obfuscate the download source (e.g., the user invoking the download).

The problem to be solved is therefore rooted in technological limitations of legacy approaches. Improved techniques, in particular improved application of technology, are needed to address the problem of deterring unauthorized disclosure of electronically shared content that is readily modified and/or copied (e.g., text). More specifically, the technologies applied in the aforementioned legacy approaches fail to achieve sought-after capabilities of the herein disclosed techniques for securing shared documents using dynamic natural language steganography in a manner that facilitates identification of the disclosing party. What is needed is a technique or techniques to improve the applicability and efficacy of various technologies as compared with legacy approaches.

SUMMARY

The present disclosure provides systems, methods, and computer program products suited to address the aforementioned issues with legacy approaches. More specifically, the present disclosure provides a detailed description of techniques used in systems, methods, and in computer program products for securing shared documents using dynamic natural language steganography. Certain embodiments are directed to technological solutions for dynamically injecting steganographic information (e.g., user attributes) into various portions of shared content using natural language processing techniques, then extracting the information from a disclosed version of the content to determine the source (e.g., the user ID) of the disclosure, which embodiments advance the relevant technical fields as well as advancing peripheral technical fields. The disclosed embodiments modify and improve over legacy approaches. In particular, the herein-disclosed techniques provide technical solutions that address the technical problems attendant to deterring unauthorized disclosure of electronically shared content that is readily modified and/or copied (e.g., text), and such technical solutions serve to reduce use of computer memory, reduce demand for computer processing power, and reduce communication overhead. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-performance computing as well as advances in various technical fields pertaining to distributed storage.

Embodiments operate within systems in a cloud-based environment, wherein one or more servers are configured to interface with storage devices that store objects accessible by one or more users. A process receives an electronic message comprising a user request to access an object. Before providing user access to the object, the system generates a requestor-specific steganographic message wherein the steganographic message is derived from some portion of requestor identification or user attributes. Various forms of a requestor-specific steganographic message are applied to the object to generate a requestor-specific protected object, which is then provided to the requestor. A web crawler can identify posted unauthorized protected object disclosures. Using requestor-specific aspects of the embedded steganographic message, the source of the unauthorized disclosure can be identified.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

The drawings described below are for illustration purposes only. The drawings are not intended to limit the scope of the present disclosure.

FIG. 4B1 presents a leak source identification technique as used in systems for securing shared documents using dynamic natural language steganography, according to an embodiment.

FIG. 4B2 presents a disclosure source probability determination technique as used in systems for securing shared documents using dynamic natural language steganography, according to an embodiment.

DETAILED DESCRIPTION

Figure 1A:
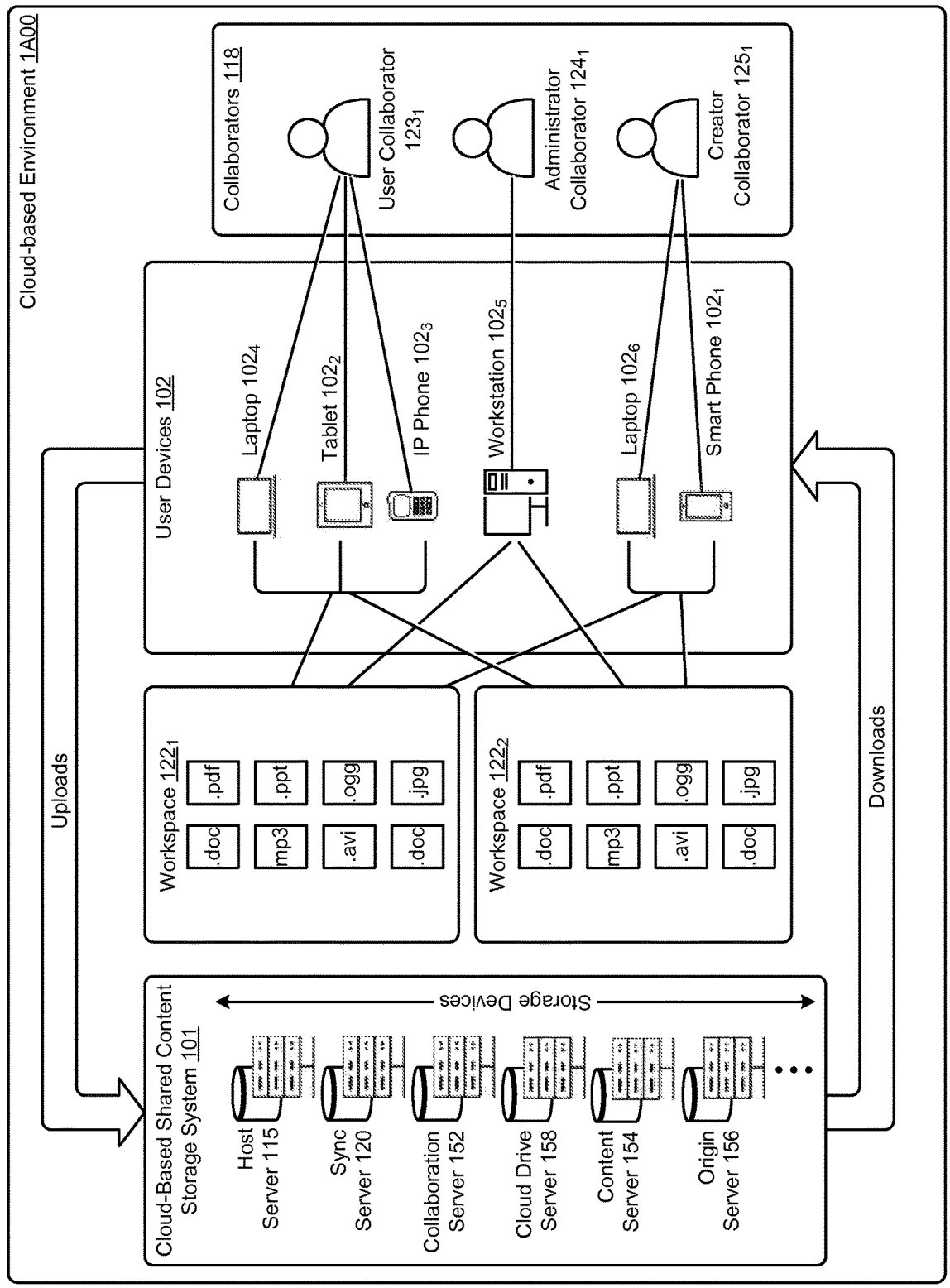
FIG. 1A presents a cloud-based environment, including a cloud-based shared content management platform, for securing shared documents using dynamic natural language steganography, according to an embodiment.

Some embodiments of the present disclosure address the problem of deterring unauthorized disclosure of electronically shared content that is readily modified and/or copied (e.g., text) and some embodiments are directed to approaches for dynamically injecting steganographic information into various portions of shared content using natural language processing techniques, then extracting the information from a disclosed version of the content to determine the source (e.g., the user ID) of the disclosure. More particularly, disclosed herein and in the accompanying figures are exemplary environments, systems, methods, and computer program products for securing shared documents using dynamic natural language steganography.

Overview

Cloud-based shared content storage systems have impacted the way personal and corporate electronically stored information objects (e.g., files, images, videos, etc.) are stored, and also has impacted the way such personal and corporate content is shared and managed. One benefit of using such cloud-based systems is the ability to share secure content (e.g., movie scripts, financial statements, product specifications, etc.) for viewing and/or downloading. In some cases, however, such secure content can be captured (e.g., downloaded, screen capture, manual copy, etc.) and disclosed (e.g., leaked) in an unauthorized manner. Some legacy techniques for providing security to documents merely apply or insert or overlay a watermarks onto a document to visually indicate a level of security and/or to indicate a level of authenticity. Such techniques, however, do not employ the herein-described techniques to track the source of inappropriate (e.g., illegal, unauthorized) dissemination of the content. Further, watermarking documents primarily comprising text have little deterring effect since the cost of defeating the watermark is small relative to the value of the content. Other legacy approaches can use natural language processing (NLP) to make known (e.g., to the content owner) changes to the text of an object that serve as a watermark on the object. Such legacy approaches, however, use fixed algorithms when applying the text changes, limiting the ability to determine the source of a leak.

To address the need for deterring unauthorized disclosure of electronically shared content that is readily modified and/or copied (e.g., text), the techniques described herein discuss: (1) configuring a server in a cloud-based environment to interface with one or more storage devices that store objects shared with multiple users; (2) detecting a request to access a shared object from one of the users; (3) generating a steganographic message derived from a selection of request attributes (e.g., user ID, device ID, request time, IP address, user geographic location, hostname, etc.); (4) identifying portions of the shared object that are candidates for encoding the steganographic message; (5) applying the steganographic message to certain candidate portions to generate a protected object; and (6) providing access to the protected object to the user.

In one or more embodiments, the techniques described herein further discuss: (7) receiving a disclosed portion of the protected object; (8) identifying the existence and bounds of a protected object from the disclosed portion to recover at least a portion of a steganographic message (e.g., a portion of the steganographic message that was applied to the object when generating the protected object); and (9) determining the request attributes (e.g., user ID) included in the recovered steganographic message.

Various embodiments are described herein with reference to the figures. It should be noted that the figures are not necessarily drawn to scale and that the elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, reference throughout this specification to "some embodiments" or "other embodiments" refers to a particular feature, structure, material, or characteristic described in connection with the embodiments as being included in at least one embodiment. Thus, the appearances of the phrase "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A presents a cloud-based environment 1A00, including a cloud-based shared content management platform, for securing shared documents using dynamic natural language steganography. As an option, one or more instances of cloud-based environment 1A00 or any aspect thereof may be implemented in the context of the architecture and functionality of the embodiments described herein. Also, the cloud-based environment 1A00 or any aspect thereof may be implemented in any environment.

As shown, certain users (e.g., collaborators 118) having various collaboration roles such as a user or administrator or creator (e.g., user collaborator $123_1$, administrator collaborator $124_1$, creator collaborator $125_1$, etc.) can use one or more instances of user devices 102 to interact with one or more workspaces (e.g., workspace $122_1$, workspace $122_2$, etc.) within the cloud-based environment 1A00. The workspaces can be stored in any location, and are at least partially maintained by components within a cloud-based shared content storage system 101. The cloud-based shared content storage system 101 supports any variety of processing elements and/or storage devices (e.g., a storage filer, a storage facility, etc.) and/or servers such as a host server 115, a sync server 120, a collaboration server 152, a cloud drive server 158, a content server 154, an origin server 156, etc.

Any of the users can access shared content from the cloud-based shared content storage system 101 without the additional process of manually downloading and storing a file locally on an instance of the user devices 102 (e.g., smart phone $102_1$, tablet $102_2$, IP phone $102_3$, laptop $102_4$, workstation $102_5$, laptop $102_6$, etc.). For example, a file (e.g., a movie script) created by the creator collaborator $125_1$ might be viewed by the user collaborator $123_1$ in a read-only mode, even without informing the user collaborator $123_1$ where the file is stored or without prompting the user collaborator $123_1$ for a directory in which to access the file. Such a facility streamlines the frequently repeated sharing and collaboration processes.

The shared content can comprise objects that are made available for access by multiple collaborators. Stored objects are stored together with or in association with various storage parameter information comprising storage parameter attributes that pertain to the stored objects. Objects that are accessed by collaborators are delivered to the requestors together with or in association with various storage parameter information comprising storage parameter attributes that pertain to respective one or more users.

Functions and techniques performed by the cloud-based shared content storage system 101 and/or the client side components (e.g., user devices 102, a sync client on an instance of the user devices 102, etc.) are described herein with further details and with reference to several examples.

Figure 1B:
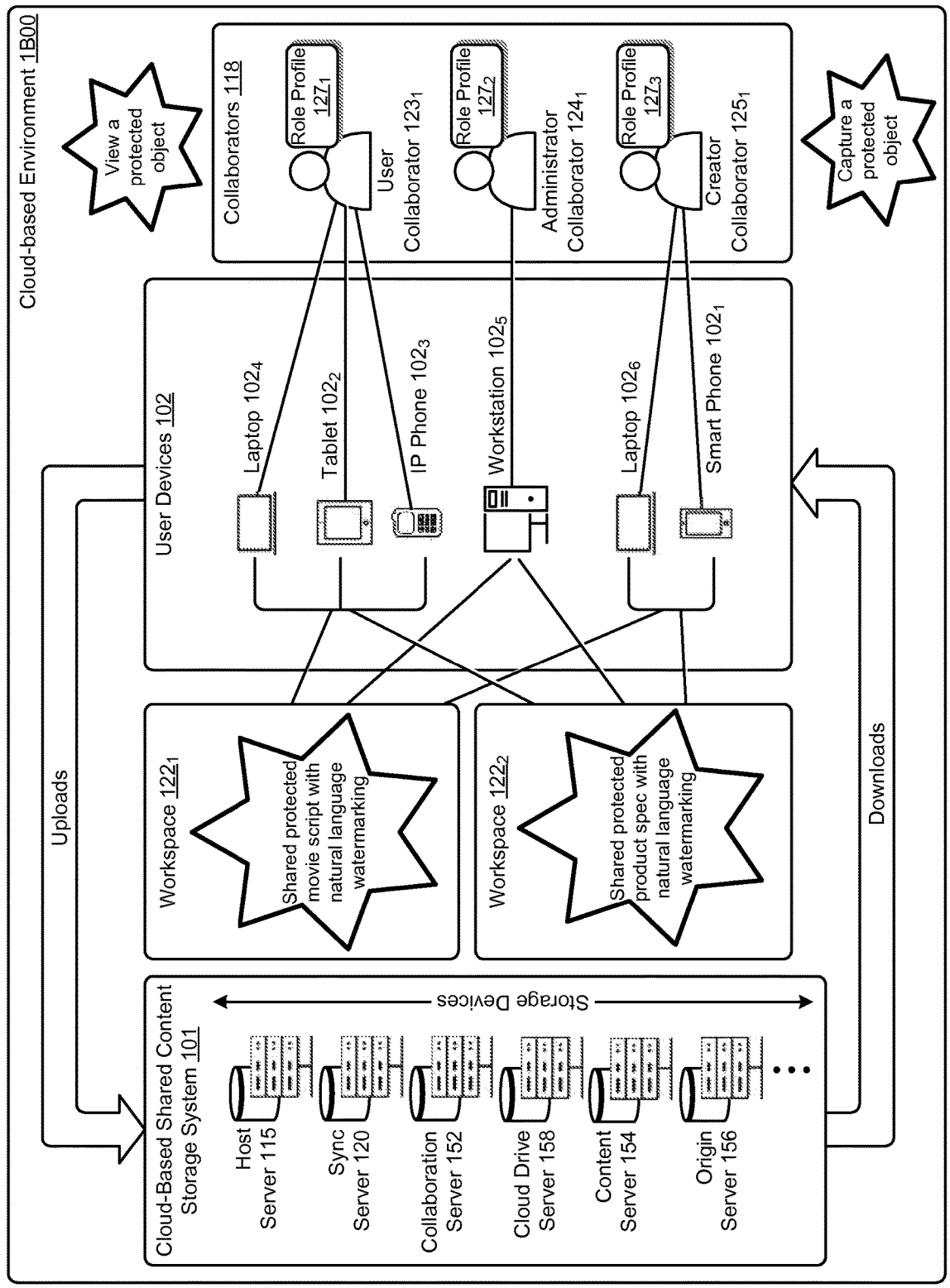
FIG. 1B presents a schematic view of workspaces that are populated with dynamically-created content that is generated when securing shared documents using dynamic natural language steganography, according to some embodiments.

FIG. 1B presents a schematic view of workspaces 1B00 that are populated with dynamically-created content that is generated when securing shared documents using dynamic natural language steganography. As an option, one or more instances of workspaces 1B00 or any aspect thereof may be implemented in the context of the architecture and functionality of the embodiments described herein. Also, the workspaces 1B00 or any aspect thereof may be implemented in any environment.

The embodiment shown in FIG. 1B is merely one example implementation of the cloud-based environment 1A00 where two or more of the collaborators 118 share an object (e.g., document, image, etc.), and where each collaborator has a certain access (e.g., for viewing, downloading, etc.) to the shared object in a respective collaborator-specific workspace (e.g., workspace $122_1$, workspace $122_2$, etc.). Moreover, a collaborator (e.g., the user collaborator $123_1$, the administrator collaborator $124_1$, and the creator collaborator $125_1$) has an associated profile (e.g., a role profile $127_1$, a role profile $127_2$, and a role profile $127_3$, respectively). Such an associated profile can comprise certain attributes such as user information (e.g., user ID, device ID, etc.) and/or user workspace metadata (e.g., file ID, etc.) and/or access permissions and/or role descriptions. One or more roles can be associated with one or more access configurations, and such roles and/or access configurations can be used in determining rules pertaining to how users share documents. Moreover, such roles and/or access configurations can be used in determining how users can view, preview, download, sync, print, and otherwise access shared documents. Further, according to the herein disclosed techniques, certain profile attributes (e.g., user ID) can be encoded in a steganographic message that can be applied to a shared object to enable detection of the source of leaked content.

More specifically, the embodiment shown in FIG. 1B indicates certain operations corresponding to viewing shared objects that are protected with dynamically generated and applied steganographic messages using natural language watermarking generation techniques. For example, a shared protected movie script having steganographic messages encoded in a natural language watermark is shown in workspace $122_1$. Also, a shared protected product specification having steganographic messages encoded in a natural language watermark is shown in workspace $122_2$. As further shown, the collaborators 118 can view and/or download such protected objects. In some cases the movie script and the product specification might be shared with certain collaborators but not intended for disclosure to other parties. When one or more collaborators violates this restriction (e.g., by copying and disclosing the movie script or product specification), the owner (e.g., creator collaborator $125_1$) might want to identify the source of the disclosed portion of the protected object. This problem of discovering the source of leaked content that is readily modified and/or copied (e.g., text) is addressed by the aforementioned techniques for applying dynamic natural language steganography to shared objects, and other techniques described herein.

Figure 1C:
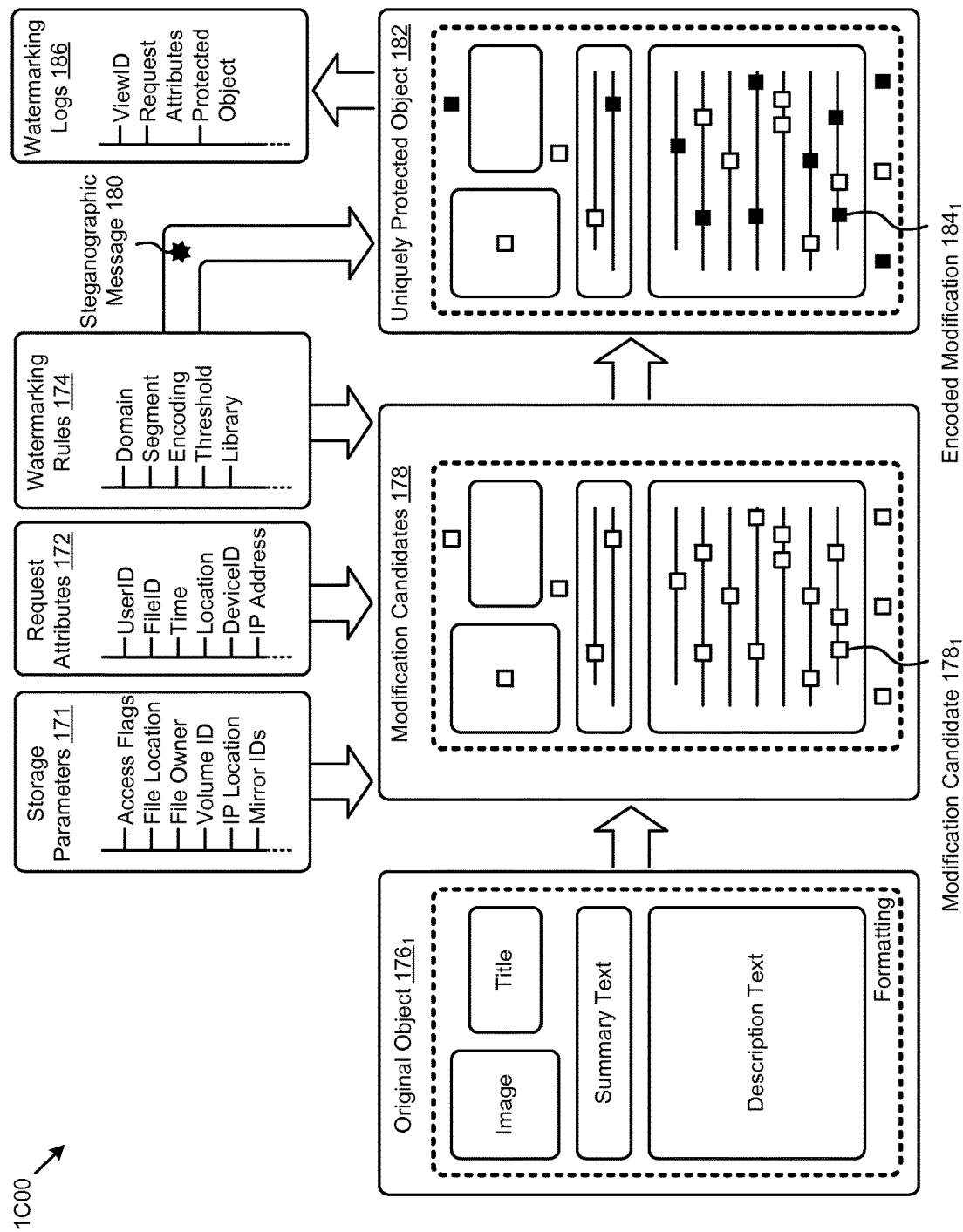
FIG. 1C illustrates an object transformation technique as used in systems for securing shared documents using dynamic natural language steganography, according to an embodiment.

FIG. 1C illustrates an object transformation technique 1C00 as used in systems for securing shared documents using dynamic natural language steganography. As an option, one or more instances of object transformation technique 1C00 or any aspect thereof may be implemented in the context of the architecture and functionality of the embodiments described herein. Also, the object transformation technique 1C00 or any aspect thereof may be implemented in any environment.

The embodiment shown in FIG. 1C is merely one example illustrating the transformation of an original object $176_1$ to a uniquely protected object 182 using the herein disclosed dynamic natural language steganography and one or more selected watermarking generation techniques. Specifically, the original object $176_1$ that a collaborator desires to protect before sharing can be segmented by content type (e.g., image, text, formatting, etc.) and further segmented by content purpose (e.g., title block, summary, detailed description, etc.). In some cases, such segments or portions can be associated with a certain type (e.g., visual, NLP, etc.) and extent (e.g., measure of change from original) of the watermarking applied. Specifically, and as shown, such associations can be specified in certain watermarking rules 174 that can be used, in part, to determine certain modification candidates 178 (e.g., modification candidate $178_1$) that might be used to watermark the original object $176_1$ or any variation or derivative of the original object (e.g., an HTML preview of the original object, an XML representation of the original object, etc.). Watermarking rules 174 might comprise relationships among the domain (e.g., movie script) and segment (e.g., actions, dialogue, etc.) of the original object $176_1$, a watermarking encoding method (e.g., NLP, image barcode, etc.), a threshold that certain content can tolerate, a library (e.g., NLP library), and/or other attributes. The modification candidates 178 can also be based on storage parameters 171 and/or request attributes 172 derived from the collaborator access requests and/or storage parameters, or any combinations involving storage parameters 171, and/or request attributes 172 and/or watermarking rules 174. Strictly as examples, the storage parameters 171 and/or the request attributes 172 can comprise a user identifier or UserID (e.g., from the role of the collaborator), a file identifier or FileID, a request time, a request location, a device identifier or DeviceID, and/or other attributes.

More specifically, the modification candidates 178 identified for NLP watermarking can comprise various combinations of word and/or sentence transformations (e.g., synonym substitution, syntactic transformations, semantic transformations, etc.) that can be applied, yet preserve a certain level of grammaticality and/or meaning of the text. In some cases, this level can be based on a subjective assessment (e.g., by a human reader) of grammaticality, meaning, and/or other characteristics of a watermarked object as compared to the same of the original object. In other cases, an objective text transformation metric can be used to measure the change between the original object and the protected object. Some such objective text transformations and metrics thereto are disclosed in Table 1, and Table 2. More specifically, variations in the text transformations (e.g., watermark) as well as the style (e.g., word variation, sentence variation) and its location in a document can be selected based on a user ID (e.g., shown below as User1, User2, User3, User4).

TABLE 1

NLP Modification of Selected Words or Sentences Based on a User ID

| Object | Watermark | Words/Sentences |
| --- | --- | --- |
| Original | — | A0 B0 C0 D0 |
| Watermarked for User1 | A1 C1 | A1 B0 C1 D0 |
| Watermarked for User2 | B2 C2 | A0 B2 C2 D0 |
| Watermarked for User3 | A3 D3 | A3 B0 C0 D3 |
| Watermarked for User4 | B4 D4 | A0 B4 C0 D4 |

Some techniques delete portions of the original object to generate a protected object that can be traced back to a particular user.

TABLE 2

Addition or Deletion of Selected Words or Sentences Based on a User ID

| Object | Watermark | Words/Sentences |
| --- | --- | --- |
| Original | — | A0 B0 C0 D0 |
| Watermarked for User1 in location L | P1 L | P1 B0 C0 L |
| Watermarked for User2 in location L | P2 L | P2 B0 C0 L |
| Watermarked for User3 in location L | P3 L | A0 P3 C0 L |
| Watermarked for User4 in location L | P4 L | A0 P4 C0 L |
| Malicious reconstruction attempt | P removed; L remains | A0 B0 C0 L |

Acts (e.g., malicious acts) that attempt to reconstruct an original from a protected document can be detected by measurements using text transformation metrics. Strictly as examples, the text transformation metric can be based on known industry metrics such as the Bilingual Evaluation Understudy or BLEU metric, the National Institute of Standards and Technology or NIST metric, and/or such as the number of transformation keystrokes and/or other metrics. In some cases, combinations of various distance metrics can be used to objectively measure the change between an original object and an objected protected with a NLP watermark. Such metrics can also be the basis for one or more transformation thresholds applied to respective segments of a given object. The techniques of Table 1 and Table 2 can use any forms of request characteristics in place of, or to augment the User ID. Strictly as one example, the request attributes 172 and/or the watermarking rules 174 can be used to determine a steganographic message 180 to encode into the uniquely protected object 182. For example, one or more of the attributes associated with the request attributes 172 and/or the watermarking rules 174 can be encrypted (e.g., into a SHA-1 hash value) to comprise the steganographic message 180. Specifically, the steganographic message 180 might comprise 160 bits of encrypted data to encode in the watermark. These bits can be apportioned to selected (e.g., based on request attributes 172, watermarking rules 174, text transformation metrics and/or thresholds, etc.) modification candidates 178 to generate one or more encoded modifications (e.g., encoded modification $184_1$) in the uniquely protected object 182. The extent or capacity of a modification (e.g., the number of bits a modification can carry) is based on the specific natural language modification technique used. For example, when considering a synonym substitution modification, the number of variations (e.g., synonyms) of the subject word can directly affect the capacity of the modification. One definition of the word "go", as an example, can have 17 synonyms, and can carry 4 bits of data (e.g., $2^4$<17). As another example, the verb "lie" might have 4 synonyms, and can carry 2 bits of data. A similar affect can be applied to text fragment (e.g., sentence) modifications (e.g., for semantic and/or syntactic transformations).

When the uniquely protected object 182 has been composed and published for a given request, a record of the composition can be included in a database of watermarking logs 186. The watermarking logs 186 can capture the relationships between the uniquely protected object 182, the request attributes 172, and other attributes. Such relationships can assist in identifying the source of a disclosed portion of a given protected object. In some cases, a unique ViewID can be assigned to a given watermarking log entry for reference. Further, the uniquely protected object 182 can be included in its entirety in the watermarking log entry for later comparisons to one or more disclosed portions of protected objects. For example, a disclosed portion of a protected object associated with a given FileID might be compared to multiple uniquely protected objects associated with the same FileID, and published in response to respective access requests. Such comparisons can be used to determine the source of a leaked protected object as described herein.

Figure 2A:
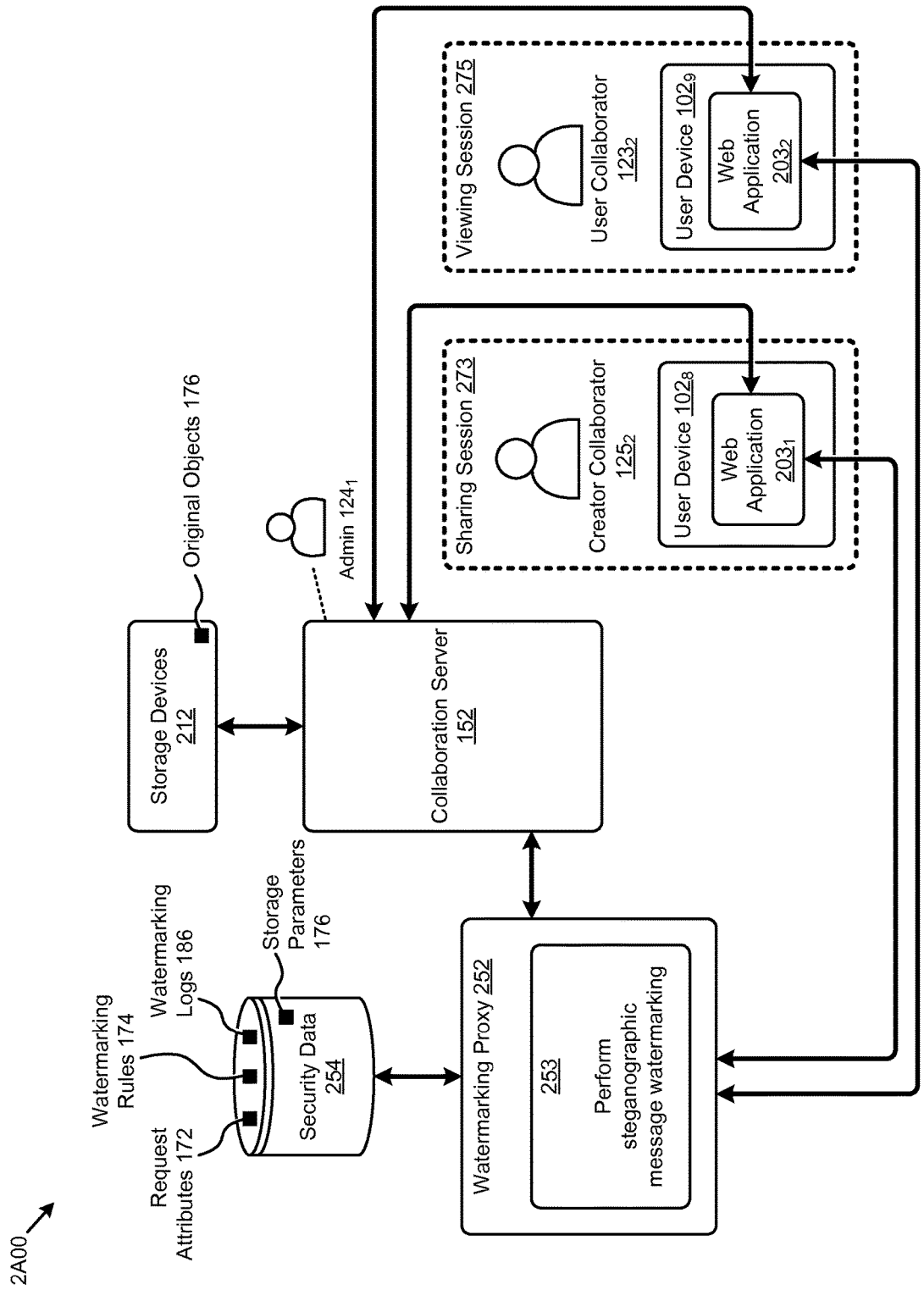
FIG. 2A presents a schematic view of a data flow to implement techniques for securing shared documents using dynamic natural language steganography, according to some embodiments.

FIG. 2A presents a schematic view of a data flow 2A00 to implement techniques for securing shared documents using dynamic natural language steganography. As an option, one or more instances of data flow 2A00 or any aspect thereof may be implemented in the context of the architecture and functionality of the embodiments described herein. Also, the data flow 2A00 or any aspect thereof may be implemented in any environment.

The shown data flow 2A00 implements collaboration when securely sharing sensitive electronically stored information objects (e.g., files, images, etc.). Collaborative object sharing can take place concurrently with other accesses in multiple concurrent sessions involving multiple concurrently sharing users. Dynamically generating and applying natural language steganographic messages to objects and other operations can be performed by a watermarking proxy 252. Such a proxy server can manipulate object representations (e.g., protected objects, views, previews, etc.) rather than manipulating the shared object source. Such operations can be employed to detect disclosed shared content sources using dynamic natural language steganography and/or watermarking.

Specifically, for example, a creator or owner (e.g., a creator collaborator $125_2$) of a sensitive object such as a movie script, might want to share the movie script with certain users (e.g., user collaborator $123_2$) such as the cast. The creator collaborator $125_2$ might employ a cloud-based shared content storage service that might use the collaboration server 152 to store the movie script object (e.g., text document) on certain storage devices 212 as an instance of original objects 176. The collaboration server 152 can further interface with the watermarking proxy 252 to assist in secure sharing and tracking of the sensitive movie script object. The creator collaborator $125_2$ and the user collaborator $123_2$ can interact with the cloud-based shared content storage service using web applications (e.g., web application $203_1$, web application $203_2$, etc.) that operate on various instances of user devices 102 (e.g., user device $102_8$, user device $102_9$, etc.), which are in communication with one or more servers (e.g., servers in a cloud-based shared content storage system). Such web applications can run in a browser, and/or under a web agent, and can communicate with the collaboration server 152 to invoke and execute certain operations (e.g., content uploads, content downloads, content viewing, content tracking, etc.) provided by the cloud-based shared content storage service. In some cases, and as shown, the web applications might communicate with the watermarking proxy 252.

More specifically, in the aforementioned movie script sharing example, the creator collaborator $125_2$ might invoke a sharing session 273 at the collaboration server 152 and invite the user collaborator $123_2$ to join for viewing and/or for downloading the movie script. In this case, the movie script can be accessed by the user collaborator $123_2$, yet the user collaborator $123_2$ is not authorized to copy and/or disclose the sensitive content. In response to accepting the invitation to join the sharing session 273, a viewing session 275 for the user collaborator $123_2$ can be invoked by the collaboration server 152. User collaborators can be configured through a management interface that can be operated by an administrator such as administrator collaborator $124_1$. According to the herein disclosed techniques, when the user collaborator $123_2$ issues a request for access to the movie script, the watermarking proxy 252 can apply a steganographic message to the movie script using natural language techniques (see operation 253) and/or can apply a steganographic message to the object and/or embedded objects using various techniques. The resulting protected version of the movie script is uniquely associated with the given request and can be published to the web application $203_2$ for access by the user collaborator $123_2$. As an example, the steganographic message and watermarking applied can be based, in part, on the request attributes 172 (e.g., UserID, FileID, etc.), storage parameters 171, and the watermarking rules 174, any combinations of which can be stored in the security data 254. A record of the published protected object, and its relationships to the request attributes 172, storage parameters 171, and watermarking rules 174, can be codified in the watermarking logs 186 and possibly stored in the security data 254.

If the user collaborator $123_2$ discloses a portion or all of the uniquely protected object that is later recovered, the recovered portion can be compared to all of the published watermarked versions of the original movie script (e.g., identified by a unique FileID) to determine the source (e.g., user collaborator $123_2$) of the leaked movie script. In some cases the disclosing party might modify the protected object before disclosure in efforts to obfuscate the source of disclosure. In such cases the recovered portion can be compared to all of the published watermarked versions of the original movie script to determine a match similarity distribution. For example, the user associated with the published watermarked version corresponding to the highest probability in the match similarity distribution can be identified as the source of the leak. The foregoing techniques and approaches for sharing secure documents using dynamic natural language steganography can be implemented in a variety of environments, some of which are shown and discussed below.

Figure 2B:
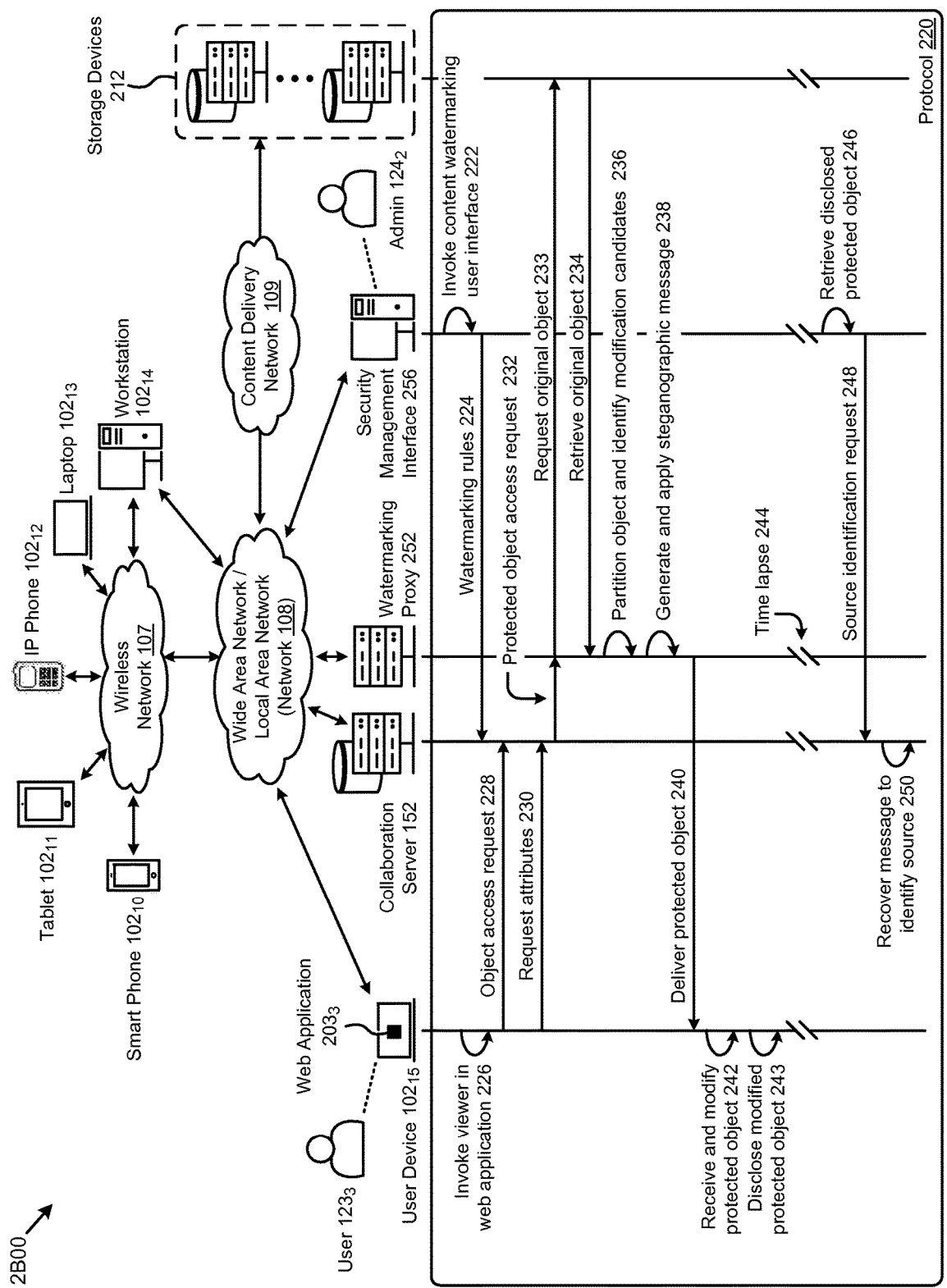
FIG. 2B depicts a computing environment supporting a protocol used by cloud-based shared content storage system components to secure shared documents using dynamic natural language steganography, according to some embodiments.

FIG. 2B depicts a computing environment 2B00 supporting a protocol used by cloud-based shared content storage system components to secure shared documents using dynamic natural language steganography. As an option, one or more instances of computing environment 2B00 or any aspect thereof may be implemented in the context of the architecture and functionality of the embodiments described herein. Also, the computing environment 2B00 or any aspect thereof may be implemented in any environment.

As shown in FIG. 2B, the computing environment 2B00 comprises various computing systems (e.g., servers and devices) interconnected by a wireless network 107, a network 108, and a content delivery network 109. The wireless network 107, the network 108, and the content delivery network 109 can comprise any combination of a wide area network (e.g., WAN), local area network (e.g., LAN), cellular network, wireless LAN (e.g., WLAN), or any such means for enabling communication of computing systems. The wireless network 107, the network 108, and the content delivery network 109 can also collectively be referred to as the Internet. The content delivery network 109 can comprise any combination of a public network and a private network. More specifically, computing environment 2B00 comprises at least one instance of the collaboration server 152, at least one instance of the watermarking proxy 252, at least one instance of a security management interface 256, and one or more storage devices 212. The servers and storage devices shown in computing environment 2B00 can represent any single computing system with dedicated hardware and software, multiple computing systems clustered together (e.g., a server farm, a host farm, etc.), a portion of shared resources on one or more computing systems (e.g., a virtual server), or any combination thereof. For example, the collaboration server 152 and the storage devices 212 can comprise a cloud-based content management platform that provides shared content management and storage services.

The computing environment 2B00 further comprises instances of user devices 102 (e.g., user device $102_{15}$) that can represent one of a variety of other computing devices (e.g., a smart phone $102_{10}$, a tablet $102_{11}$, an IP phone $102_{12}$, a laptop $102_{13}$, a workstation $102_{14}$, etc.) having software (e.g., a web application $203_3$, etc.) and hardware (e.g., a graphics processing unit, display, monitor, etc.) capable of processing and displaying information (e.g., web page, graphical user interface, etc.) on a display. The user device $102_{15}$ can further communicate information (e.g., web page request, user activity, electronic files, etc.) over the wireless network 107, the network 108, and the content delivery network 109. As shown, the user device $102_{15}$ can be operated by a user collaborator such as user $123_3$. Also, the security management interface 256 can be operated by an administrator collaborator such as admin $124_2$.

As shown, the user device $102_{15}$, the collaboration server 152, the watermarking proxy 252, the security management interface 256, and the storage devices 212 can exhibit a set of high-level interactions (e.g., operations, messages, etc.) in a protocol 220. Specifically, the protocol can represent interactions in systems for protecting shared, electronically stored content and detecting disclosed content sources using dynamic natural language steganography. As shown, the admin $124_2$ can invoke a content watermarking user interface on the security management interface 256 (see operation 222), and upload certain watermarking rules to the collaboration server 152 (see message 224). The user $123_3$ can also invoke a viewer in the web application $203_3$ on user device $102_{15}$ (see operation 226) and issue to the collaboration server 152 a request to access an object (see message 228). In response, the collaboration server 152 can receive request attributes (see message 230) and forward the request attributes (e.g., request attributes 172) in a protected object access request (see message 232) to the watermarking proxy 252. The watermarking proxy 252 can obtain the original object (see message 233 and message 234) from the storage devices 212. The original object can be partitioned and natural language watermarking modification candidates identified (see operation 236). The watermarking proxy 252 can then generate and apply (e.g., encode) a steganographic message to the original object (see operation 238) to publish a protected object uniquely composed for this specific request from user $123_3$ (see message 240).

For example, the protected object can be based, in part, on various attributes associated with the given request such as UserID, FileID, time, user location, DeviceID, etc. The user $123_3$ might receive and modify (e.g., change text, delete sections, etc.) the protected object (see operation 242), such that the disclosed portion is different from a corresponding portion of the protected object. The user $123_3$ might then disclose all or a portion of the modified protected object to one or more unauthorized parties (see operation 243). After a time lapse 244, the admin $124_2$ might retrieve the disclosed portion of the modified protected object (see operation 246) and invoke a request to identify the source of the leak (see message 248). For example, the disclosed portion might be discovered and associated with an original FileID by a crawler service operating on the watermarking proxy 252, the collaboration server 152, and/or another server. The collaboration server 152 can employ the herein disclosed techniques to determine and/or predict the source (e.g., UserID) of the disclosing collaborator (see operation 250).

Further details regarding general approaches to watermarking and use of a watermarking proxy are described in U.S. application Ser. No. 14/802,950 titled "EVENT-DRIVEN GENERATION OF WATERMARKED PREVIEWS OF AN OBJECT IN A COLLABORATION ENVIRONMENT" filed on Jul. 17, 2015, which is hereby incorporated by reference in its entirety.

Figure 2C:
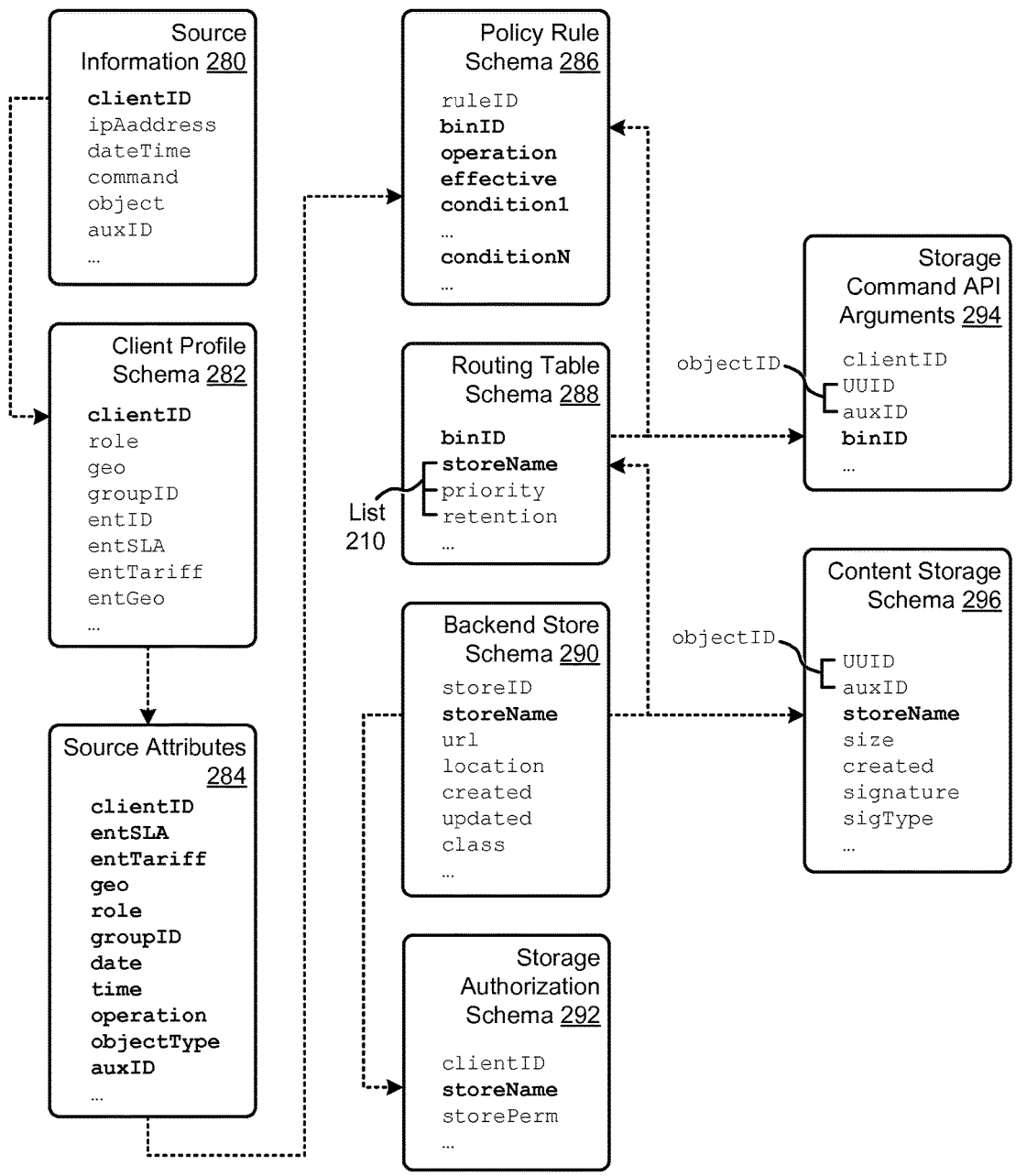
FIG. 2C depicts a diagram showing data structure relationships used by cloud-based shared content storage system components to secure shared documents using dynamic natural language steganography, according to some embodiments.

The watermarking proxy 252 can access any forms of security data, including storage parameters, some of which are shown and discussed as pertains to FIG. 2C.

FIG. 2C depicts a diagram showing data structure relationships 2C00 used by cloud-based shared content storage system components to secure shared documents using dynamic natural language steganography. As an option, one or more instances of the data structure relationships 2C00 or any aspect thereof may be implemented in the context of the architecture and functionality of the embodiments described herein. Also, the data structure relationships 2C00 or any aspect thereof may be implemented in any desired environment.

The shown data structure relationships 2C00 depict example information, attributes, schema, command arguments, and select entity relationships associated with data structures and datasets. Other information and relationships are possible. Specifically, the source information 280 can comprise clientID, ipAddress, dateTime, command information, object information, auxID, and might contain other information and/or be derived from other locations. For example, clientID, ipAddress, and dateTime might be session parameters captured in a cookie log file. Also, for example, the auxID can be specified by the client and/or client application to identify one or more objects. As shown, the client ID in the source information 280 can be used to look up associated information in client profiles (e.g., role profile $127_1$, role profile $127_2$, role profile $127_3$, etc.). For example, the client profile schema 282 might describe a table having columns for the role, geo location, and groupID associated with the clientID, and columns for related enterprise level information, including entID, entSLA, entTariff, entGeo, and other columns of information. The source information 280 and associated instances of client profile data can be used to generate descriptions (e.g., key-value pairs) to form instances of source attributes 284 such as clientID, entSLA, entTariff, geo, groupID, date, time, operation, objectType, auxID, and other attributes. The source attributes 284 might comprise key-value pairs in the form of (for example) role=Admin, entSLA=Tier 1, and geo=US.

Storage policies and/or rules can be described in accordance with a policy rule schema 286. An associated storage operation, an effective time period, one or more conditions (e.g., condition1, . . . , and conditionN), and other information. More specifically, certain source attributes 284 (e.g., role=Admin, etc.) can be used as rule operands to determine a particular policy (e.g., binID="policyAdmin") to execute. Routing table schema 288 can include a list 210 of one or more storage facilities described by a storeName, a priority attribute (e.g., synchronous, asynchronous, etc.), and a retention attribute (e.g., infinite, two weeks, etc.). Other information can be used to describe a given policy. In some embodiments, the order of the storage facilities in the list 210 indicates a priority relationship and/or other relationships. When such lists are communicated using JSON syntax, they can be referred to as "fragments". The storeName further references the backend store metadata that can be structured according to the backend store schema 290. As shown by the backend store schema 290, the backend store metadata describes the physical storage facility location that may be associated with a portion of a given storage policy. Specifically, the backend store metadata might comprise a table having columns for storeID, storeName, the storage facility URL, the storage path or directory location, a created time, an updated time, a class (e.g., 1=flash, 2=fastDisk, . . . , N=coldStorage), a backendType, a path, a layoutVersion indicator, a readOnly characteristic, and other columns. In some cases, the storeID can be a unique identifier associated with the instance of a policy manager that communicates with a given storage facility and/or associated with the content site comprising the given storage facility. A reference to the storeName can further be included in any forms of storage authorization metadata, as shown in the storage authorization schema 292, and used with permissions storePerm and other information to determine if client clientID is authorized to access storeName.

Embodiments of content storage metadata, including any variations or combinations of storage parameters (with, or without respective values) can be created and/or updated and/or accessed according to a content storage schema.

The storeName can reference a specific store location described in the backend store metadata. In some embodiments, the UUID and the storeID can be the same globally unique identifier to reduce storage command complexities. Also, in one or more embodiments, the auxID can be concatenated to the UUID to form a contentID. For example, the auxID can be used to distinguish various representations of the same originating content object. In other embodiments, a containerID and/or the auxID and/or the contentID and/or the UUID are used in respective contexts. Any of the foregoing can be represented in conformance with a content storage schema 296.

According to the herein disclosed techniques, a storage command API using the storage command API arguments 294 can be can used to issue storage commands to one or more content storage facilities. In one or more embodiments, such a storage command API can comprise the commands shown in Table 3 and Table 44 below.

TABLE 3

Storage Command API - Content Access Operations

| Ref | Information |
|---|---|
| 1 | Generate Object UUID<br>POST storage/<clientID>/<binID> |
| 2 | Upload an Object<br>PUT storage/<clientID>/<binID>/<objectID> |
| 3 | Upload Multiput Object<br>PUT storage/<clientID>/<binID>/<objectID>?part=<N> |
| 4 | Get Status of Multiput Object Upload<br>GET storage/<clientID>/<binID>/<objectID>?status |
| 5 | Commit Multiput Object<br>POST storage/<clientID>/<binID>/<objectID>?commit |
| 6 | Download an Object<br>GET storage/<clientID>/<binID>/<objectID> |
| 7 | Delete Object<br>DELETE storage/<clientID>/<binID>/<objectID> |
| 8 | List Objects Associated with UUID<br>GET storage/<clientID>/<binID>/<UUID>?list |
| 9 | Get Byte Offset of Incomplete Upload<br>HEAD storage/<clientID>/<binID>/<objectID> |

TABLE 4

Storage Command API - Management Operations

| Ref | Information |
|---|---|
| 1 | Upload Content Storage Metadata<br>PUT storage/<clientID>/<binID>/<objectID>?metadata |
| 2 | Get Object Info<br>GET storage/<clientID>/<binID>/<objectID>?info |
| 3 | Create New Backend Store<br>POST storageid |
| 4 | Update Metadata for Backend Store<br>PUT storageid/<storeID> |
| 5 | Update Select Metadata for Backend Store<br>PATCH storageid/<storeID> |
| 6 | Get Metadata for a Backend Store<br>GET storageid/<storeID> |
| 7 | Delete a Backend Store<br>DELETE storageid/<storeID> |
| 8 | Get Metadata for all Backend Stores<br>GET storageid/db |
| 9 | Get Metadata for Cached Backend Stores<br>GET storageid/cache |
| 10 | Reload Backend Store Cache from Database<br>PUT storageid/reload |
| 11 | Create or Update Storage Policy<br>PUT policy/<binID> |
| 12 | Delete a Storage Policy<br>DELETE policy/<binID> |
| 13 | Get Metadata for all Storage Policies<br>GET policy/db |
| 14 | Get Metadata for Cached Storage Policies |

TABLE 4-continued

Storage Command API - Management Operations

| Ref | Information |
|---|---|
| 15 | GET policy/cache<br>Reload Storage Policy Cache from Database<br>PUT policy/reload |

Further details regarding general approaches to content storage metadata are described in U.S. application Ser. No. 14/727,777 titled "ACCESSING MULTIPLE CONTENT STORAGE FACILITIES USING SOURCE-AWARE STORAGE POLICIES", filed on Jun. 1, 2015, which is hereby incorporated by reference in its entirety.

Any of the foregoing storage parameters and/or schema can be used for selecting a watermarking technique, and/or for determining or applying object partitioning techniques over shared documents.

Figure 3:
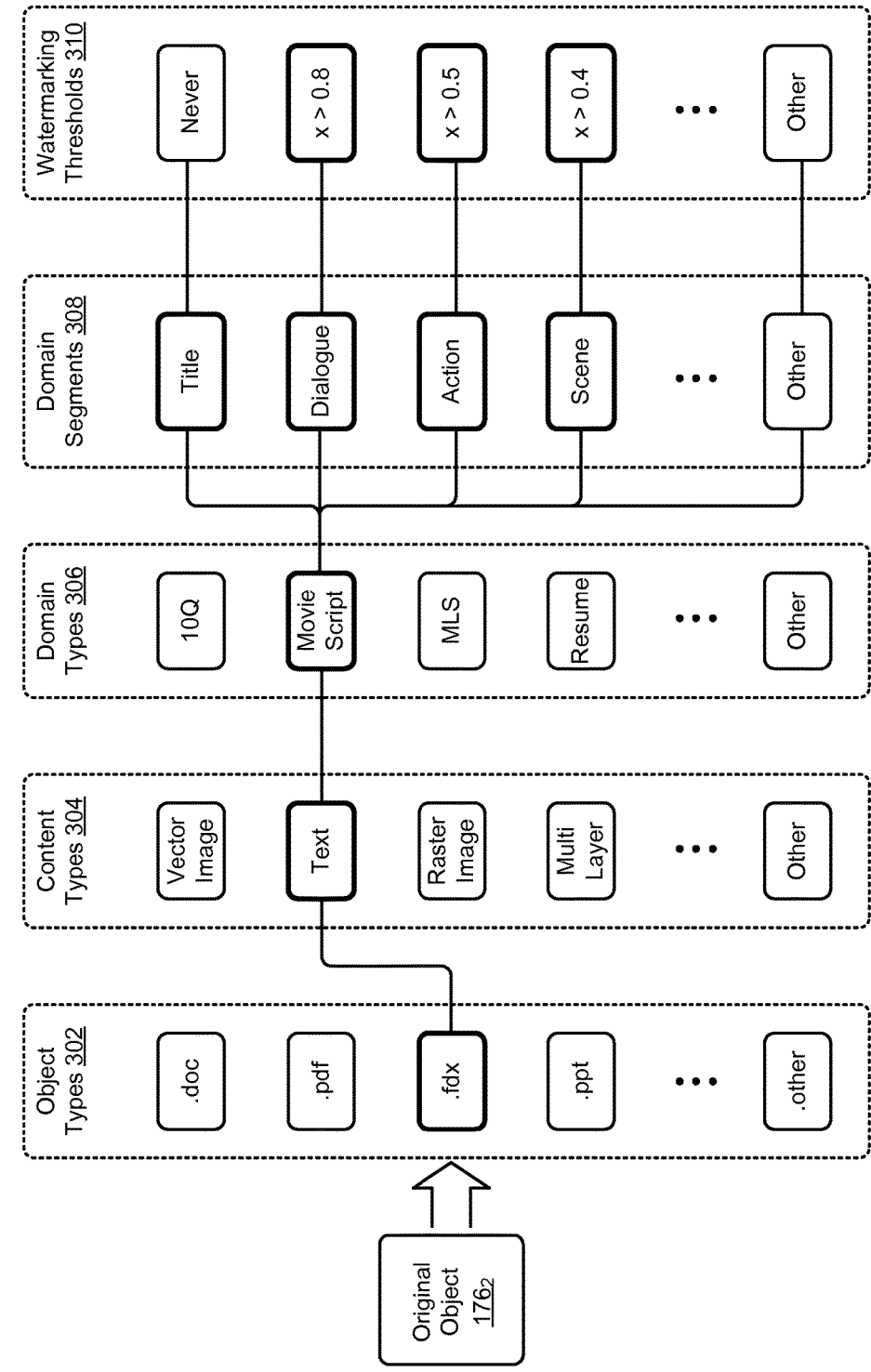
FIG. 3 depicts an object partitioning technique used when applying various object transformations in systems that secure shared documents using dynamic natural language steganography, according to an embodiment.

FIG. 3 depicts an object partitioning technique 300 used when applying various object transformations in systems that secure shared documents using dynamic natural language steganography. As an option, one or more instances of object partitioning technique 300 or any aspect thereof may be implemented in the context of the architecture and functionality of the embodiments described herein. Also, the object partitioning technique 300 or any aspect thereof may be implemented in any environment.

The object partitioning technique 300 shown in FIG. 3 can be used to select the type and extent of watermarking techniques to be applied to an object for secure sharing in a collaborative environment. Specifically, the object partitioning technique 300 can be used to dynamically apply natural language steganography to secure shared documents as disclosed herein. More specifically, FIG. 3 shows an original object $176_2$ having one of a plurality of object types 302 as may be saved as a file, and that may include a file extension (e.g., .doc, .pdf, .fdx, .ppt, etc.). Any technique can be used to determine the content and format of the object. For example, the original object $176_2$ might be a movie script, having an ".fdx" extension indicating an XML-based format, and using any technique (e.g., inspection of the contents), the original object $176_2$ (or derivative therefrom) can be further partitioned into one or more content types 304 (e.g., vector image, text, raster image, multi-layer, etc.). In some embodiments, content types 304 can determine the type of watermarking that can be applied to a given content type. For example, natural language watermarking can be applied to the text portion of the original object $176_2$ according to the herein disclosed techniques. The text portion of the original object $176_2$ can further be characterized by one or more domain types 306 and domain segments 308. For example, the XML schema of the movie script can be parsed and analyzed to determine that the object is of, or belongs in the "movie script" domain and can be partitioned into specific instances of content from any of the domain segments 308 (e.g., title block, dialogue, action, scene, etc.). In some embodiments, varying extents of natural language steganography can be applied to a given domain segment according to one or more watermarking thresholds 310. For example, and as shown, the "Title" information can be identified as a segment that should not be modified since even small changes to content (e.g., movie title, writer name, etc.) in this segment can significantly impact the meaning and purpose of the content. The "Dialogue" segment might also be sensitive to modification, yet be able to tolerate a relatively small change. For example, for a given text transformation metric having a range from 0 to 1, where transformed text that is identical to the original text has a score of 1, the watermarking threshold for the "Dialogue" segment might be set at a threshold of 0.8. For segments such as "Action" and "Scene" that can tolerate more change from the original, the respective watermarking thresholds might be set at thresholds of 0.5 and 0.4, respectively. Such thresholds and other characteristics of the object partitioning technique 300 can be included in the watermarking rules 174 and/or other aspects of the embodiments described herein. Moreover, thresholds as heretofore described can be used over a single document or object, or over a set of documents or objects, or singly, or in combination with each other (e.g., in a hierarchy or in a precedence order, or in combination with other thresholds (e.g., local or global thresholds), or in combination with a penalty metric (e.g., a cost to modify) or might not be used at all. In some cases, non-parametric algorithms are used. As such, heuristics might be used rather than thresholds.

Figure 4A:
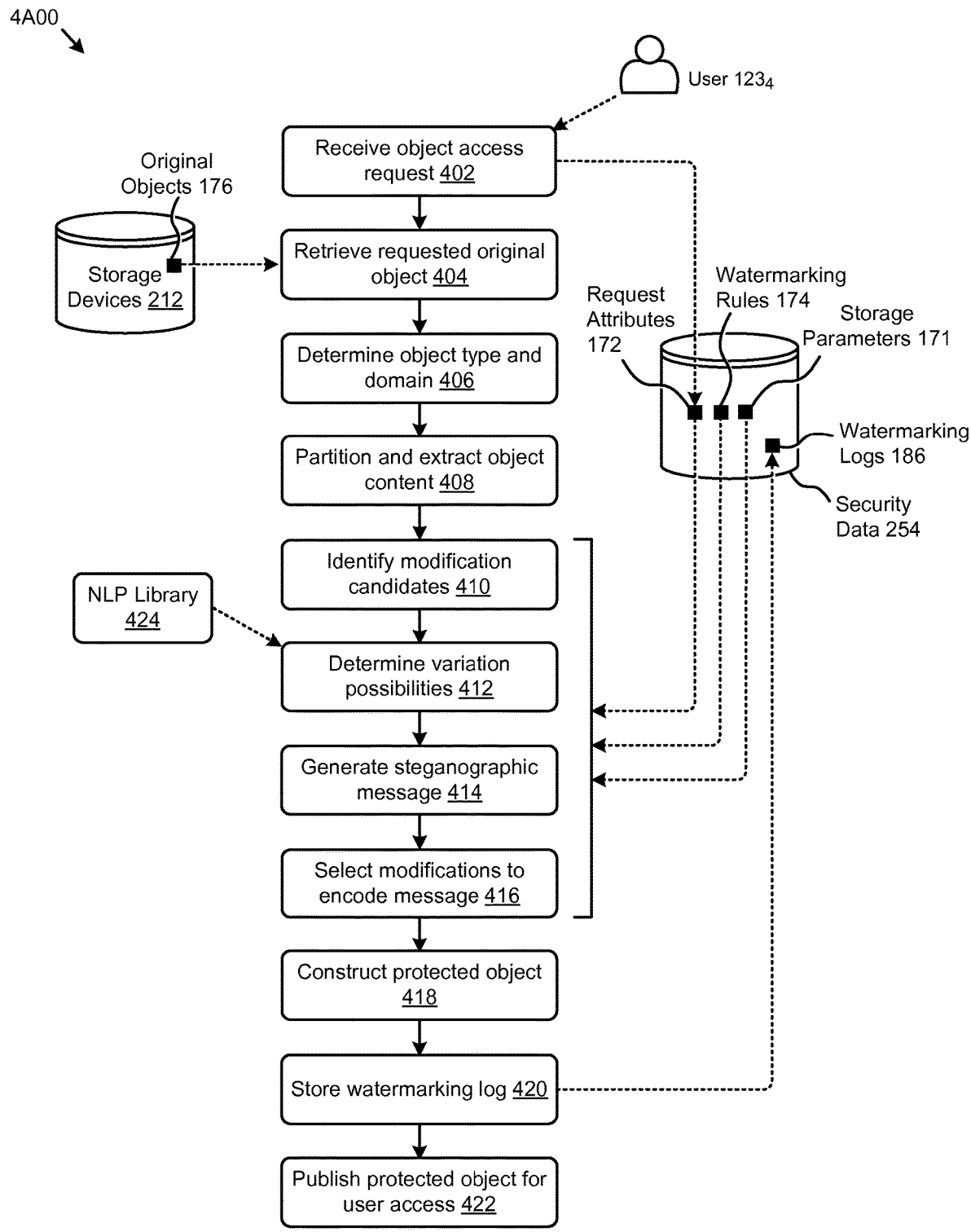
FIG. 4A presents a steganographic information injection technique as used in systems for securing shared documents using dynamic natural language steganography, according to an embodiment.

FIG. 4A presents a steganographic information injection technique 4A00 as used in systems for securing shared documents using dynamic natural language steganography. As an option, one or more instances of steganographic information injection technique 4A00 or any aspect thereof may be implemented in the context of the architecture and functionality of the embodiments described herein. Also, the steganographic information injection technique 4A00 or any aspect thereof may be implemented in any environment.

The steganographic information injection technique 4A00 presents one embodiment of certain steps for injection of steganographic message information into shared objects using dynamic natural language steganography. In one or more embodiments the steps and underlying operations shown in the steganographic information injection technique 4A00 can be executed by the watermarking proxy 252 in FIG. 2A. For reference, the steganographic information injection technique 4A00 further depicts the storage devices 212 comprising the original objects 176, and the security data 254 comprising the request attributes 172, the watermarking rules 174, and the watermarking logs 186.

Specifically, the steganographic information injection technique 4A00 starts with receiving, over a network, an object access request message from a user (see step 402) such as user $123_4$. Such a request can comprise certain attributes (e.g., UserID, FileID, time, location, etc.) that can be stored as request attributes 172, which can in turn be stored in the security data 254. The requested original object from the original objects 176 in the storage devices 212 can be retrieved (see step 404), and the object type and object domain can be determined (see step 406). When the object type and object domain are determined, further partitioning and extraction of content can be performed (see step 408). For example, the object partitioning technique 300 can be used to determine the type and domain, and further segments and/or characteristics of the original object can be determined. Specifically, for example, an object can be determined to be an XML-based movie script, and the dialogue content identified (e.g., between tags <dialogue> . . . </dialogue>) and extracted for processing. For each content partition, modification candidates can be identified (see step 410). In some cases the request attributes 172 and/or the watermarking rules 174 can be used to determine the modification candidates. The variation possibilities for the modification candidates can then be determined (see step 412). For example, an NLP library 424 can be used to identify variations (e.g., synonyms, syntactic transformations, semantic transformations, etc.) that might be used to carry an encoded a steganographic message. Specifically, according to some embodiments, the steganographic message can be derived in part from the request attributes 172 and/or the watermarking rules 174 (see step 414), and/or any set or extent of storage parameter information so as to generate a protected object that is uniquely watermarked for a given request. Strictly as one example pertaining to a cloud-based shared content storage environment, a particular requestor may request from a uniquely-identifiable device, and/or, a particular user can be in association with a unique workspace and/or group of collaborators. A watermarking generation technique can be selected based in part on any of the foregoing. Furthermore, a steganographic message can be generated from or derived from any of the foregoing (e.g., a hash value can be seeded from a unique workspace ID) and/or any of a range of storage parameter information values that may exist within a cloud-based shared content storage environment.

Certain modification candidate sites can be selected to encode the steganographic message (see step 416) in a protected object (see step 418). A watermarking log comprising the protected object and/or a reference to the protected object, and an association to one or more of the request attributes 172 (e.g., UserID, FileID, etc.) can then be stored (see step 420). The protected object comprising dynamically generated natural language steganography is then ready to be published for access by the user (see step 422).

In addition to the foregoing encoding techniques is the technique of encoding different attributes into different modification sites. In some cases (e.g., depending on the nature of the object being protected), a counter-measure against an attacker might be implemented by releasing multiple different watermarked copies to different users so as to calibrate penalty measures.

In one or more embodiments the information recorded in the watermarking logs 186 as described herein can be used to determine and/or predict the source of a disclosed portion of one or more protected objects. One such technique for identifying the disclosure source (e.g., leak source) is described as pertains to FIG. 4B1.

FIG. 4B1 presents a leak source identification technique 4B100 as used in systems for securing shared documents using dynamic natural language steganography. As an option, one or more instances of leak source identification technique 4B100 or any aspect thereof may be implemented in the context of the architecture and functionality of the embodiments described herein. Also, the leak source identification technique 4B100 or any aspect thereof may be implemented in any environment.

The leak source identification technique 4B100 presents one embodiment of certain steps for identifying the source of unauthorized disclosure of a protected object. Specifically, the leak source identification technique 4B100 can be implemented in embodiments that use dynamically generated natural language steganography techniques as discussed herein. In some cases (e.g., when the recovered protected object is not modified), the leak source identification technique 4B100 can determine with certainty the characteristics of the specific attributes associated with the user access request corresponding to the recovered protected object. In other cases (e.g., when the recovered protected object is modified) the leak source identification technique 4B100 can determine a high probability match of the recovered protected object to a certain user access request. In one or more embodiments, the steps and underlying operations shown in FIG. 4B1 can be executed by the various environments and systems (e.g., collaboration server 152) described herein. As shown, leak source identification technique 4B100 further references the security data 254 comprising certain watermarking logs 186.

The leak source identification technique 4B100 starts with uploading a recovered disclosed protected object (see step 432). For example, an admin $124_3$ might invoke the leak source identification technique 4B 100 at the security management interface 256. The FileID of the recovered protected object can be determined (see step 434) using various techniques (e.g., admin $124_3$ specifies the FileID, crawler service, etc.). The partitions and/or segments of the recovered protected object are then determined (see step 436). For example, the disclosing party might have removed and/or rearranged various portions of the document to obfuscate the disclosure source. A set of published protected objects associated with the FileID can then be identified from the watermarking logs 186 in the security data 254 (see step 438).

An iterative process comparing the recovered protected object to the set of published protected objects can begin by selecting a first published protected object (see step 440). A document distance (e.g., an edit distance referring to a total number of keystrokes to effect a modification) is calculated so as to provide a quantitative difference between the recovered protected object and the selected published protected object (see step 442). In some cases, multiple document distances are calculated on the basis of differences between one object and another object. For example, it is possible to pre-calculate differences between an original object and a protected (e.g., viewed) object, and to also calculate differences between a protected (e.g., viewed) object and a suspected leaked document, and to combine the two calculated differences to determine a difference between a protected document and a suspected leaked object.

If more published protected objects remain (see decision 444), then the next published protected object can be selected (see step 446) and compared to the recovered protected object in step 442. As the iterative comparison process repeats, a match similarity distribution can be constructed from the edit distance calculations. When all of the identified published protected objects have been processed, the published protected object with the highest probability in the match similarity distribution can be determined (see step 448). For example, the highest probability match might correlate to the lowest edit distance (e.g., fewest number of keystrokes). Other factors to consider in determining match probability are possible. The watermarking log entries corresponding to the published protected object having the highest probability matches to the recovered object can then be used to determine various attributes related to the request that generated the published protected object. Specifically, the UserID, DeviceID, location, time, and other request attributes can be extracted from the watermarking logs 186 to assist in identification of the source or sources of unauthorized disclosure of the protected object. As such, when processing the protected objects, it is possible to use watermarking log entries to facilitate extracting one or more user identities from the watermarking log (see step 450).

In some cases, the admin $124_3$ might want to view and use the match similarity distribution to make one or more decisions. Such a technique and uses thereof are discussed in FIG. 4B2.

FIG. 4B2 presents a disclosure source probability determination technique 4B200 as used in systems for securing shared documents using dynamic natural language steganography. As an option, one or more instances of disclosure source probability determination technique 4B200 or any aspect thereof may be implemented in the context of the architecture and functionality of the embodiments described herein. Also, the disclosure source probability determination technique 4B200 or any aspect thereof may be implemented in any environment.

The disclosure source probability determination technique 4B200 presents one embodiment of certain steps for generating a similarity distribution of possible sources of a particular unauthorized disclosure of a protected object. Specifically, the disclosure source probability determination technique 4B200 can be implemented in embodiments that use dynamically generated natural language steganography techniques as discussed herein. In some cases (e.g., when the recovered protected object is not modified), the disclosure source probability determination technique 4B200 might clearly reveal with certainty the characteristics of the specific attributes associated with the user access request corresponding to the recovered protected object. In other cases (e.g., when the recovered protected object is modified) the disclosure source probability determination technique 4B200 can produce a distribution of probabilities (e.g., comprising sets of highest probabilities and sets of lower probabilities) that certain user access requests correspond to the recovered protected object. In one or more embodiments, the steps and underlying operations shown in FIG. 4B2 can be executed by the various environments and systems (e.g., collaboration server 152) described herein. As shown, disclosure source probability determination technique 4B200 further references the security data 254 comprising certain watermarking logs 186.

The disclosure source probability determination technique 4B200 can commence with uploading a recovered disclosed protected object (see step 452). For example, an admin $124_3$ might invoke the disclosure source probability determination technique 4B200 at the security management interface 256. The FileID of the recovered protected object can be determined (see step 454) using various techniques (e.g., admin $124_3$ specifies the FileID, crawler service, etc.). The partitions and/or segments of the recovered protected object are then determined (see step 456). For example, the disclosing party might have removed and/or rearranged various portions of the document to obfuscate the disclosure source. A set of published protected objects associated with the FileID can then be identified from the watermarking logs 186 in the security data 254 (see step 458).

An iterative process comparing the recovered protected object to the set of published protected objects can begin by selecting a first published protected object (see step 460). A match probability between the recovered protected object and the selected published protected object can be calculated (see step 462). For example, objective text transformation metrics can be used to estimate the match probability between the recovered protected object and the selected published protected object. Such text transformation metrics can be based on known industry metrics such as the Bilingual Evaluation Understudy metric, the National Institute of Standards and Technology metric, and/or other metrics. In some cases, various "distance" metrics, such as the number of transformation keystrokes, can be used to estimate the match probability between the recovered protected object and the selected published protected object. If more published protected objects remain (see decision 464), then the next published protected object can be selected (see step 466) and compared to the recovered protected object to determine a match probability in step 462. As the iterative comparison process repeats, a match similarity distribution can be constructed (see step 468) and made available for viewing by an administrator (e.g., admin $124_3$) and/or any number of stakeholders (see step 470).

Figure 4C:
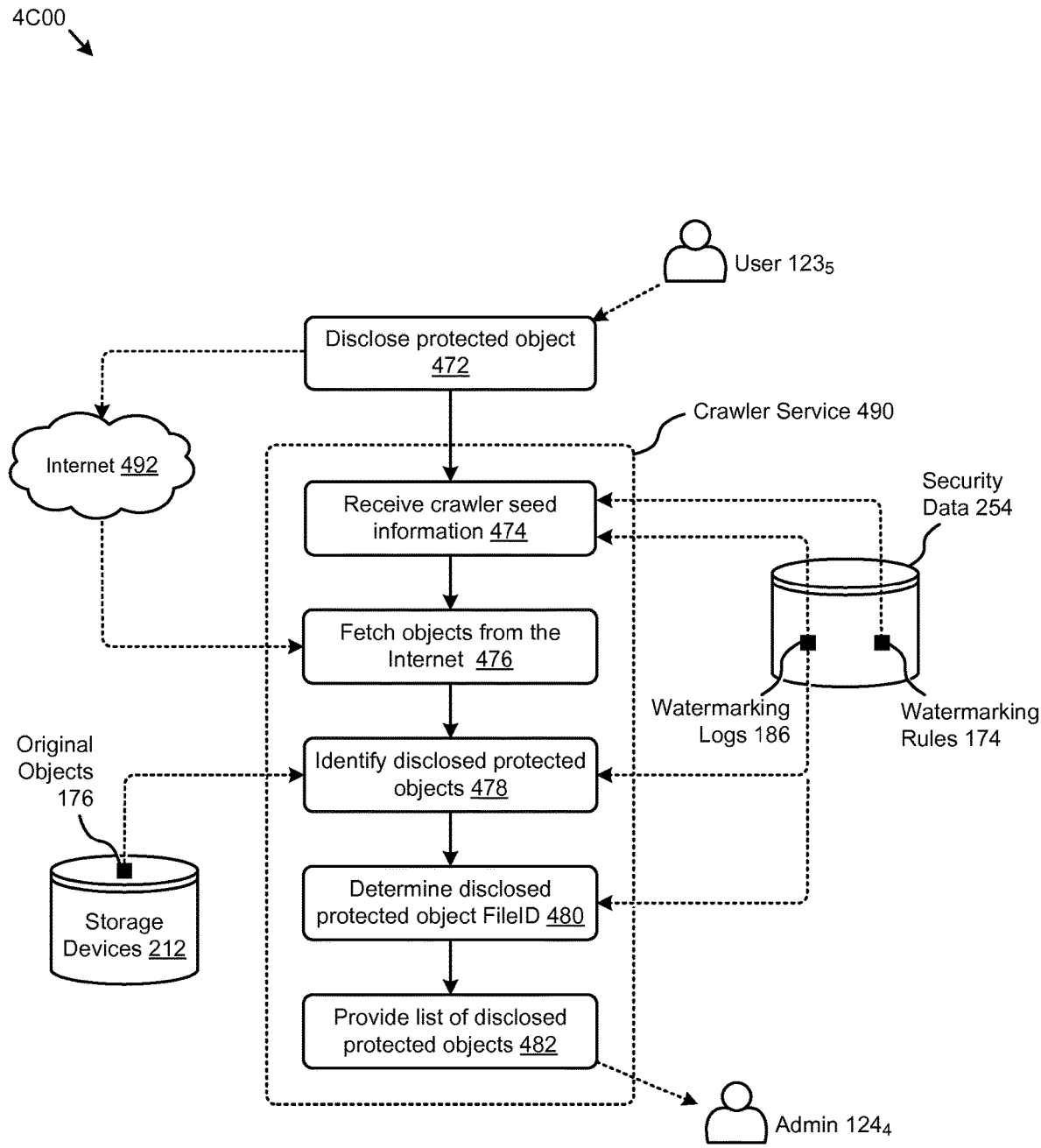
FIG. 4C presents a disclosed protected object discovery technique as used in systems for securing shared documents using dynamic natural language steganography, according to an embodiment.

According to the foregoing leak source identification technique 4B100 and disclosure source probability determination technique 4B200, a recovered disclosed protected object and associated FileID of the original object are used. FIG. 4C discusses a technique for searching for and identifying such recovered disclosed protected objects and FileIDs.

FIG. 4C presents a disclosed protected object discovery technique 4C00 as used in systems for securing shared documents using dynamic natural language steganography. As an option, one or more instances of disclosed protected object discovery technique 4C00 or any aspect thereof may be implemented in the context of the architecture and functionality of the embodiments described herein. Also, the disclosed protected object discovery technique 4C00 or any aspect thereof may be implemented in any environment.

The disclosed protected object discovery technique 4C00 presents one embodiment of certain steps for searching for and identifying disclosed protected objects. Specifically, the disclosed protected object discovery technique 4C00 can be implemented in embodiments that use dynamically generated natural language steganography techniques as discussed herein. In one or more embodiments, the steps and underlying operations shown in FIG. 4C can be executed by a crawler service 490 operating in the various environments and systems (e.g., collaboration server 152, watermarking proxy 252, etc.) described herein. As shown, the disclosed protected object discovery technique 4C00 further references the security data 254 comprising certain watermarking logs 186 and watermarking rules 174, and the storage devices 212 comprising the original objects 176.

The disclosed protected object discovery technique 4C00 can commence with a user $123_5$ disclosing all or a portion of a protected object on the Internet 492 (see step 472). The crawler service 490 might receive certain seed information (see step 474) to improve the efficiency of crawler operations. For example, the crawler service 490 might extract information from the watermarking logs 186 and watermarking rules 174 that identify certain URLs, domains, object types, and other information to constrain the scope of the crawler. Other information from the owners (e.g., enterprises) of protected documents might be provided to seed the crawler. The crawler service 490 can use the seed information and other information to fetch objects from the Internet 492 (see step 476). The fetched objects can then be examined to identify any disclosed protected objects (see step 478). For example, the crawler service 490 might use an index of original objects 176 and/or watermarking logs 186 (e.g., that include references to published protected objects) to identify such disclosed protected objects. When a fetched object has been identified as a disclosed protected object (e.g., or portion thereof), the associated FileID of the protected object can be determined (see step 480). For example, the FileID can be retrieved from an instance of the watermarking logs 186 associated with the disclosed protected object. The crawler service 490 might then provide a list of the identified disclosed protected objects and associated FileIDs (see step 482). For example, an admin $124_4$ might then use an accessible portion of the list to determine the source of the disclosure according to the herein disclosed techniques (e.g., see FIG. 4B1 and FIG. 4B2).

As described herein, the disclosed techniques and systems for securing shared documents using dynamic natural language steganography can be used by content creators and/or owners sharing sensitive content in a cloud-based shared content storage environment. An embodiment of an interface for interacting with such systems is described as pertains to FIG. 5.

Figure 5:
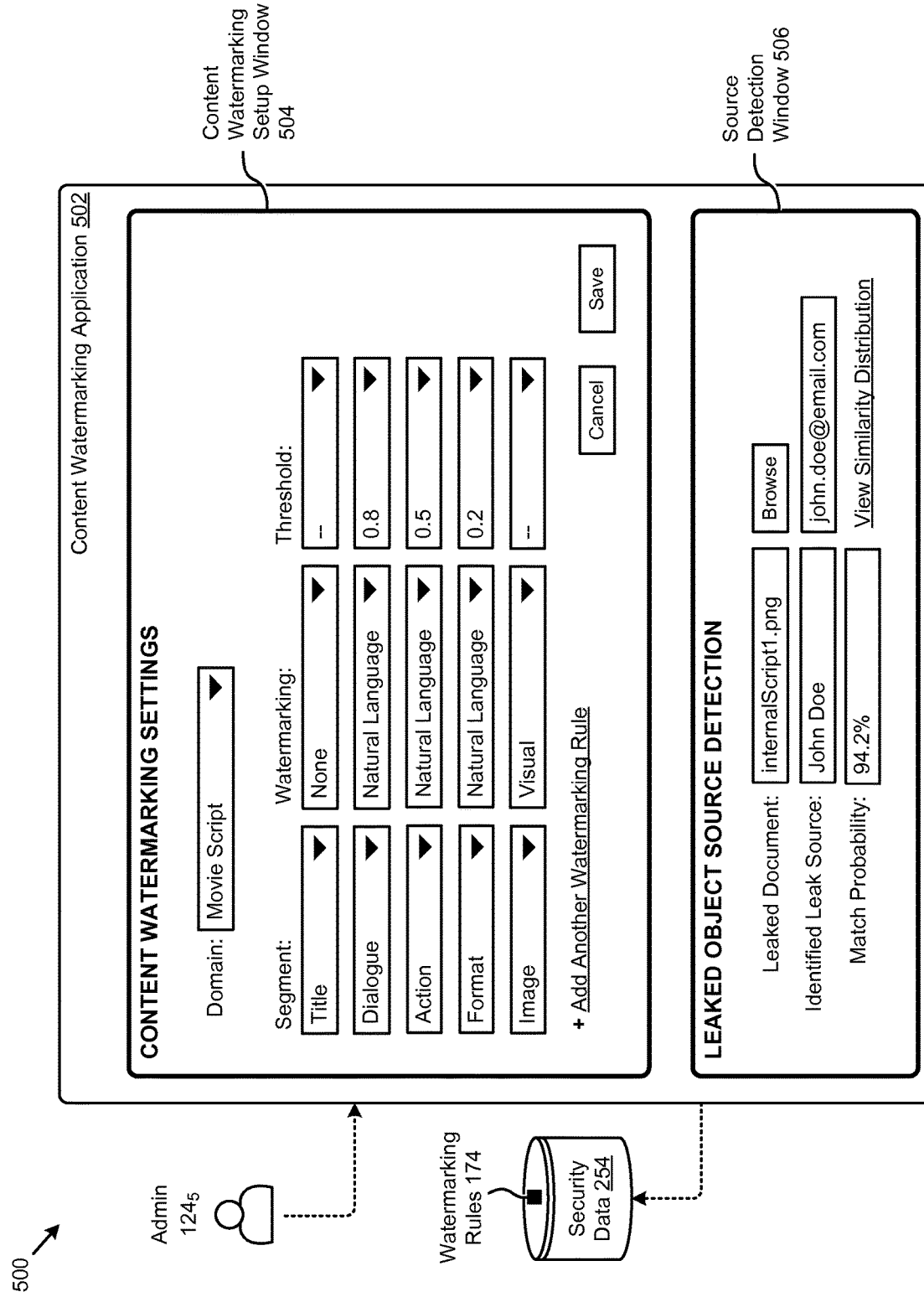
FIG. 5 depicts a content watermarking user interface as used in systems for securing shared documents using dynamic natural language steganography, according to an embodiment.

FIG. 5 depicts a content watermarking user interface 500 as used in systems for securing shared documents using dynamic natural language steganography. As an option, one or more instances of content watermarking user interface 500 or any aspect thereof may be implemented in the context of the architecture and functionality of the embodiments described herein. Also, the content watermarking user interface 500 or any aspect thereof may be implemented in any environment.

Specifically, the content watermarking user interface 500 shown in FIG. 5 can be used by an administrator collaborator, such as admin $124_5$, to establish various content watermarking rules and settings (e.g., watermarking rules 174), invoke the analysis of a recovered protected object for identification of the disclosure source, and other operations. In one or more embodiments, the content watermarking user interface 500 can be included in a content watermarking application 502 operating on one or more computing devices (e.g., security management interface 256, an instance of user devices 102, etc.). More specifically, the content watermarking user interface 500 can comprise a content watermarking setup window 504 and a source detection window 506. As shown, the content watermarking setup window 504 can present various input entry elements (e.g., dropdown selections, text boxes, etc.) through which the admin $124_5$ can associate various watermarking rules with a given object domain (see FIG. 3). The watermarking rules, for example, can further associate a domain "Segment" with a certain "Watermarking" technique and a corresponding sensitivity "Threshold". One or more watermarking rules can be associated with the given object domain as shown. For example, the admin $124_5$ can select a domain "Movie Script" and specify no watermarking for the "Title" segment, "Natural Language" watermarking with a sensitivity threshold of 0.8 for the "Dialogue" segment, etc. More watermarking rules can be added to the domain if needed. The specified set of rules associated with the domain can be saved and used to secure shared documents using dynamic natural language steganography according to the herein disclosed techniques.

Further, the source detection window 506 can enable the admin $124_5$ to invoke an analysis of a recovered protected object that has been leaked to determine and/or predict the source of the leak, according to the herein disclosed techniques. Specifically, the admin $124_5$ can "Browse" and select a recovered protected object for analysis (e.g., "internalScript1.png"). When the recovered protected object has been selected, a process for identifying the request attributes (e.g., UserID, etc.) corresponding to the published protected object having the highest probability match to the recovered protected object can be invoked (see FIG. 4B1). As shown, the identified leak source (e.g., "John Doe", "john.doe@email.com") and match probability (e.g., 94.2%), when applicable, can be displayed. In some cases, the admin $124_5$ might want to click on "View Similarity distribution" to observe the probability of all potential matches to the recovered protected object (see FIG. 4B2).

Additional Embodiments of The Disclosure

Additional Practical Application Examples

Figure 6A:
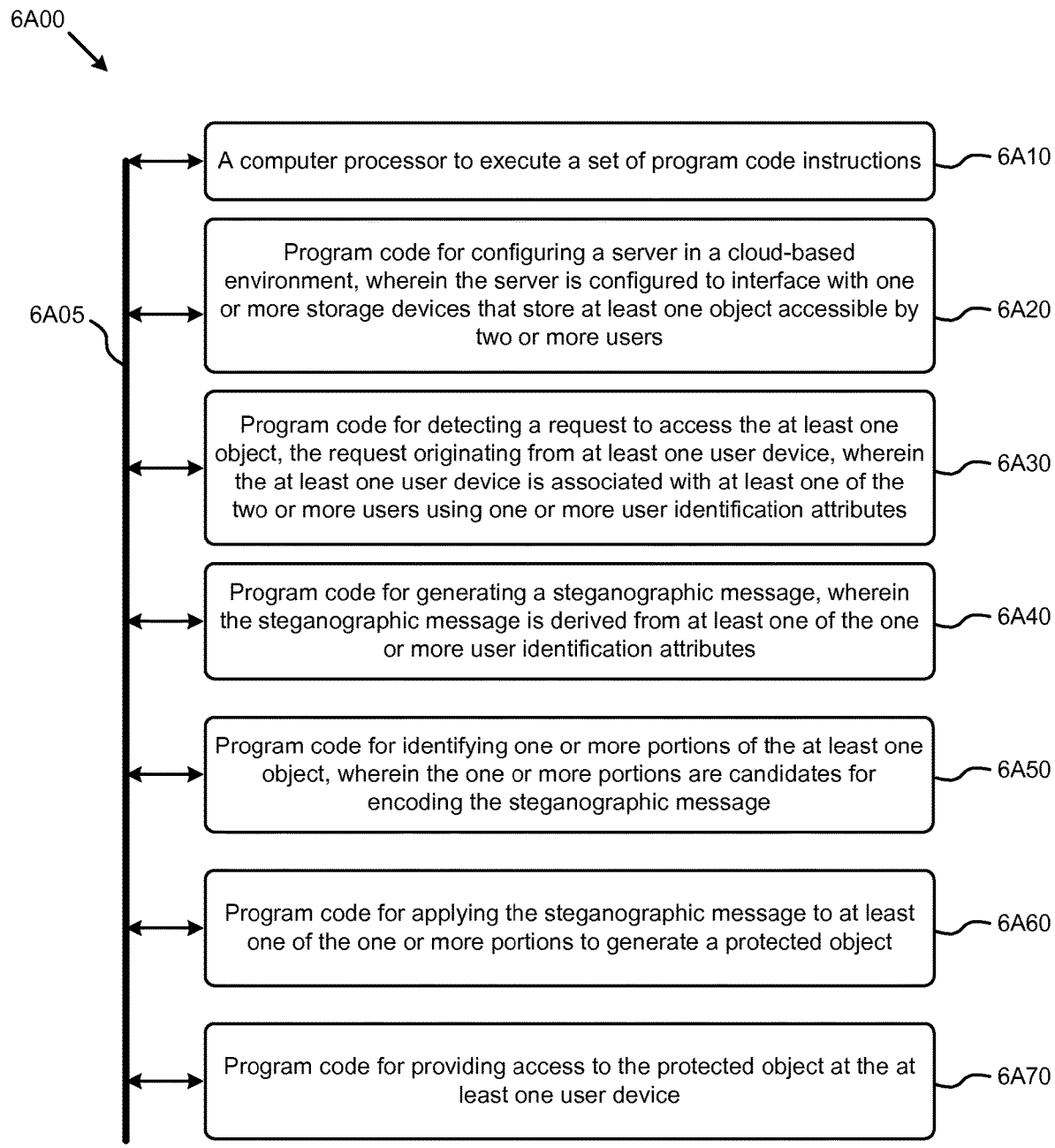
FIG. 6A and FIG. 6B depict system components as arrangements of computing modules that are interconnected so as to implement certain of the herein-disclosed embodiments.

FIG. 6A depicts a system 6A00 as an arrangement of computing modules that are interconnected so as to operate cooperatively to implement certain of the herein-disclosed embodiments. The partitioning of system 6A00 is merely illustrative and other partitions are possible. As an option, the present system 6A00 may be implemented in the context of the architecture and functionality of the embodiments described herein. Of course, however, the system 6A00 or any operation therein may be carried out in any desired environment. The system 6A00 comprises at least one processor and at least one memory, the memory serving to store program instructions corresponding to the operations of the system. As shown, an operation can be implemented in whole or in part using program instructions accessible by a module. The modules are connected to a communication path 6A05, and any operation can communicate with other operations over communication path 6A05. The modules of the system can, individually or in combination, perform method operations within system 6A00. Any operations performed within system 6A00 may be performed in any order unless as may be specified in the claims. The shown embodiment implements a portion of a computer system, presented as system 6A00, comprising a computer processor to execute a set of program code instructions (see module 6A10) and modules for accessing memory to hold program code instructions to perform: configuring a server in a cloud-based environment, wherein the server is configured to interface with one or more storage devices that store at least one object accessible by users (see module 6A20); detecting a request to access the at least one object, the request originating from at least one user device, wherein the at least one user device is associated with at least one of the users using one or more user identification attributes (see module 6A30); generating a steganographic message, wherein the steganographic message is derived from at least one of the one or more user identification attributes (see module 6A40); identifying one or more portions of the at least one object, wherein the one or more portions comprise candidate sites for encoding the steganographic message (see module 6A50); applying the steganographic message to at least one of the one or more portions to generate a protected object (see module 6A60); and providing access to the protected object at the at least one user device (see module 6A70).

Figure 6B:
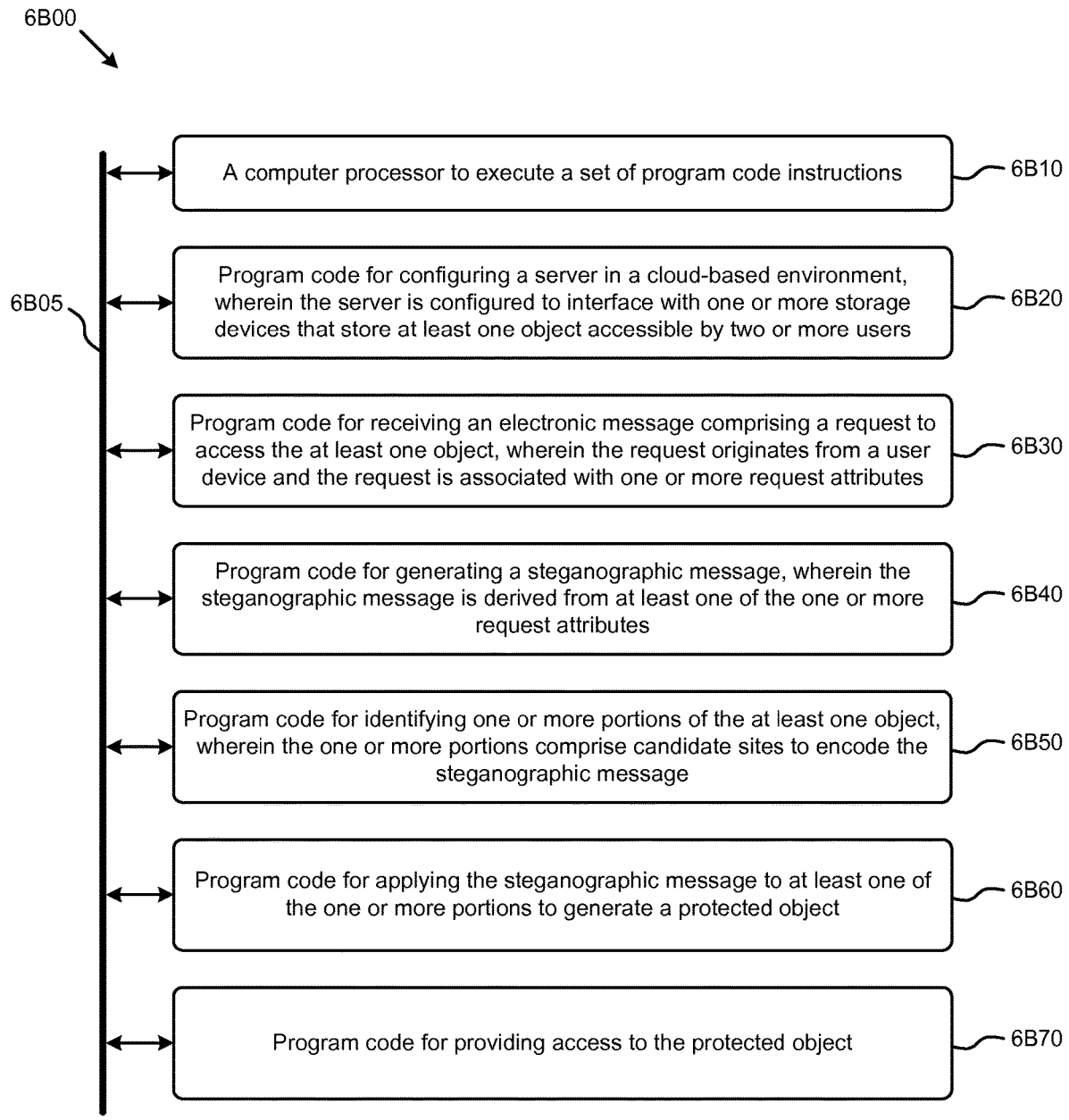

FIG. 6B depicts a system 6B00 as an arrangement of computing modules that are interconnected so as to operate cooperatively to implement certain of the herein-disclosed embodiments. The partitioning of system 6B00 is merely illustrative and other partitions are possible. As an option, the present system 6B00 may be implemented in the context of the architecture and functionality of the embodiments described herein. Of course, however, the system 6B00 or any operation therein may be carried out in any desired environment. The system 6B00 comprises at least one processor and at least one memory, the memory serving to store program instructions corresponding to the operations of the system. As shown, an operation can be implemented in whole or in part using program instructions accessible by a module. The modules are connected to a communication path 6B05, and any operation can communicate with other operations over communication path 6B05. The modules of the system can, individually or in combination, perform method operations within system 6B00. Any operations performed within system 6B00 may be performed in any order unless as may be specified in the claims. The shown embodiment implements a portion of a computer system, presented as system 6B00, comprising a computer processor to execute a set of program code instructions (see module 6B10) and modules for accessing memory to hold program code instructions to perform: configuring a server in a cloud-based environment, wherein the server is configured to interface with one or more storage devices that store at least one object accessible by one or more users (see module 6B20); receiving an electronic message comprising a request to access the at least one object, wherein the request originates from a user device and the request is associated with one or more request attributes (see module 6B30); generating a steganographic message, wherein the steganographic message is derived from at least one of the one or more request attributes (see module 6B40); identifying one or more portions of the at least one object, wherein the one or more portions comprise candidate sites to encode the steganographic message (see module 6B50); applying the steganographic message to at least one of the one or more portions to generate a protected object (see module 6B60); and providing access to the protected object (see module 6B70).

Some embodiments select a watermarking generation technique and/or generate a steganographic message based on storage parameter information pertaining to the stored objects. For example, in one sequence, (1) a first collaborator accesses an object that has a first storage parameter attribute or value related to the first user, (2) a second collaborator accesses the same object that has a second storage parameter attribute or value related to the second user, (3) a different watermarking generation technique is selected, and/or a different steganographic message is generated based on the difference between the first storage parameter and the second storage parameter.

System Architecture Overview
Additional System Architecture Examples

Figure 7A:
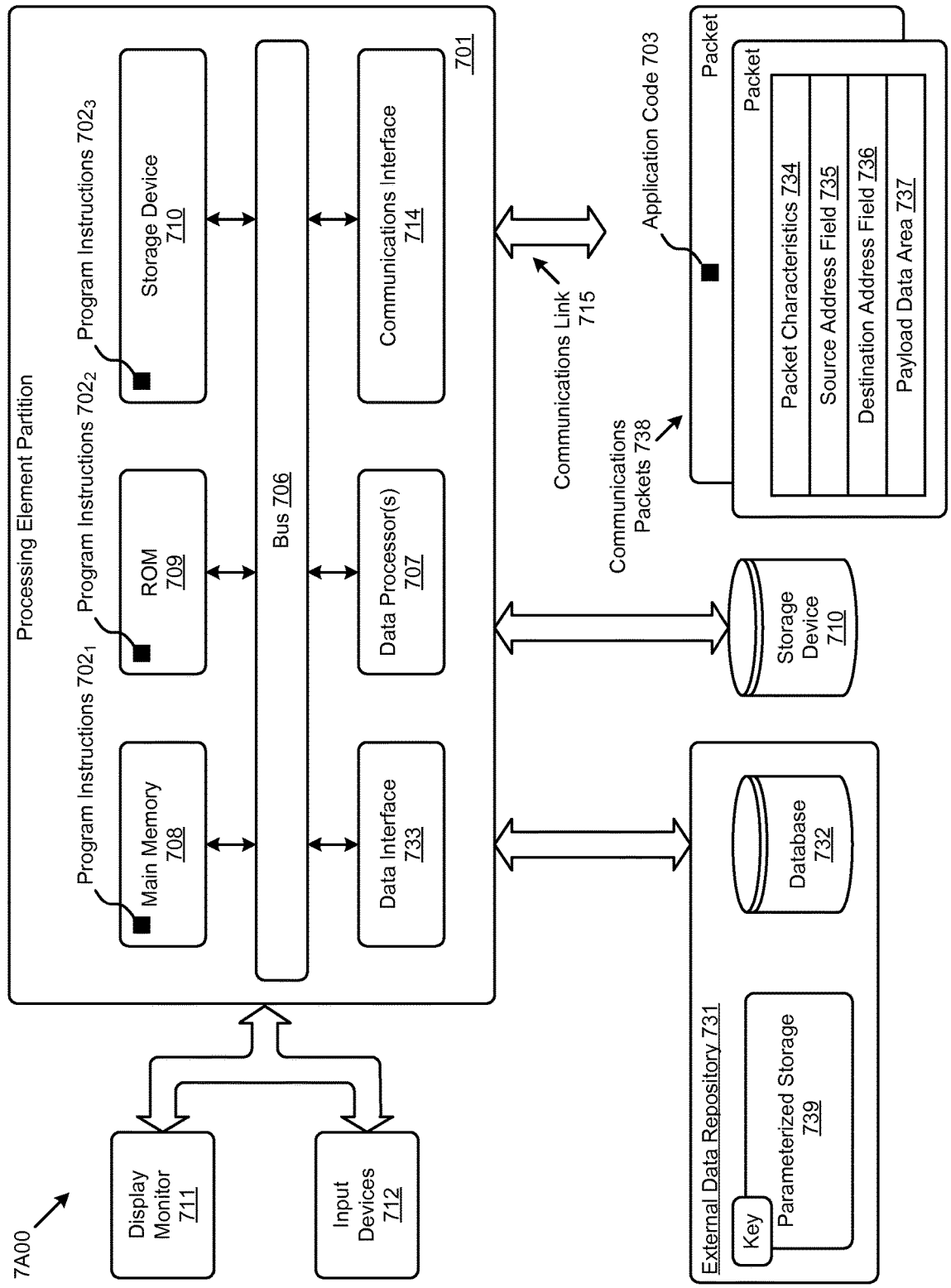
FIG. 7A and FIG. 7B depict exemplary architectures of components suitable for implementing embodiments of the present disclosure, and/or for use in the herein-described environments.

FIG. 7A depicts a block diagram of an instance of a computer system 7A00 suitable for implementing embodiments of the present disclosure. Computer system 7A00 includes a bus 706 or other communication mechanism for communicating information. The bus interconnects subsystems and devices such as a central processing unit (CPU), or a multi-core CPU (e.g., data processor 707), a system memory (e.g., main memory 708, or an area of random access memory (RAM)), a non-volatile storage device or non-volatile storage area (e.g., read-only memory 709), an internal or external storage device 710 (e.g., magnetic or optical), a data interface 733, a communications interface 714 (e.g., PHY, MAC, Ethernet interface, modem, etc.). The aforementioned components are shown within processing element partition 701, however other partitions are possible. The shown computer system 7A00 further comprises a display 711 (e.g., CRT or LCD), various input devices 712 (e.g., keyboard, cursor control), and an external data repository 731.

According to an embodiment of the disclosure, computer system 7A00 performs specific operations by data processor 707 executing one or more sequences of one or more program code instructions contained in a memory. Such instructions (e.g., program instructions $702_1$, program instructions $702_2$, program instructions $702_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination therefrom.

According to an embodiment of the disclosure, computer system 7A00 performs specific networking operations using one or more instances of communications interface 714. Instances of the communications interface 714 may comprise one or more networking ports that are configurable (e.g., pertaining to speed, protocol, physical layer characteristics, media access characteristics, etc.) and any particular instance of the communications interface 714 or port thereto can be configured differently from any other particular instance. Portions of a communication protocol can be carried out in whole or in part by any instance of the communications interface 714, and data (e.g., packets, data structures, bit fields, etc.) can be positioned in storage locations within communications interface 714, or within system memory, and such data can be accessed (e.g., using random access addressing, or using direct memory access DMA, etc.) by devices such as data processor 707.

The communications link 715 can be configured to transmit (e.g., send, receive, signal, etc.) any types of communications packets 738 comprising any organization of data items. The data items can comprise a payload data area 737, a destination address 736 (e.g., a destination IP address), a source address 735 (e.g., a source IP address), and can include various encodings or formatting of bit fields to populate the shown packet characteristics 734. In some cases the packet characteristics include a version identifier, a packet or payload length, a traffic class, a flow label, etc. In some cases the payload data area 737 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 707 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 731, which in turn can be formatted into any one or more storage areas, and which can comprise parameterized storage 739 accessible by a key (e.g., filename, table name, block address, offset address, etc.).

Execution of the sequences of instructions to practice certain embodiments of the disclosure are performed by a single instance of the computer system 7A00. According to certain embodiments of the disclosure, two or more instances of computer system 7A00 coupled by a communications link 715 (e.g., LAN, PTSN, or wireless network) may perform the sequence of instructions required to practice embodiments of the disclosure using two or more instances of components of computer system 7A00.

The computer system 7A00 may transmit and receive messages such as data and/or instructions organized into a data structure (e.g., communications packets 738). The data structure can include program instructions (e.g., application code 703), communicated through communications link 715 and communications interface 714. Received program code may be executed by data processor 707 as it is received and/or stored in the shown storage device or in or upon any other non-volatile storage for later execution. Computer system 7A00 may communicate through a data interface 733 to a database 732 on an external data repository 731. Data items in a database can be accessed using a primary key (e.g., a relational database primary key).

The processing element partition 701 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 707. Some embodiments include one or more special-purpose hardware components (e.g., power control, logic, sensors, transducers, etc.). A module may include one or more state machines and/or combinational logic used to implement or facilitate the performance characteristics resulting from techniques for securing shared documents using dynamic natural language steganography.

Various implementations of the database 732 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of techniques for securing shared documents using dynamic natural language steganography). Such files or records can be brought into and/or stored in volatile or non-volatile memory.

Figure 7B:
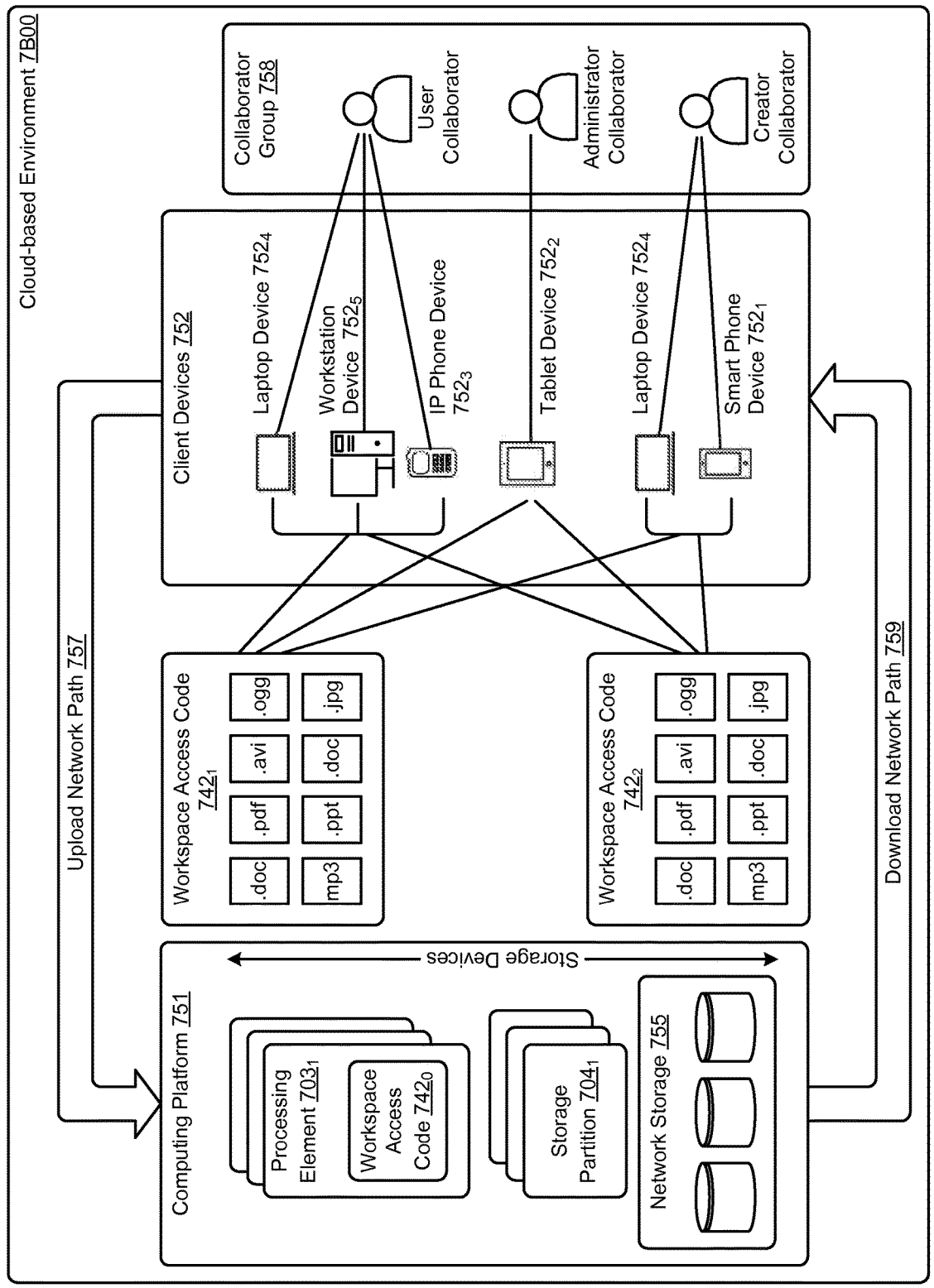

FIG. 7B depicts a block diagram of an instance of a cloud-based environment 7B00. Such a cloud-based environment supports access to workspaces through the execution of workspace access code (e.g., workspace access code $742_0$, workspace access code $742_1$ and workspace access code $742_2$). Workspace access code, possibly in the form of a client application or client app or client applet can be executed on any of the shown client devices 752 (e.g., laptop device $752_4$, workstation device $752_5$, IP phone device $752_3$, tablet device $752_2$, smart phone device $752_1$, etc.). A group of users can form a collaborator group 758, and a collaborator group can be composed of any types or roles of users. For example, and as shown, a collaborator group can comprise a user collaborator, an administrator collaborator, a creator collaborator, etc. Any user can use any one or more of the user devices, and such user devices can be operated concurrently to provide multiple concurrent sessions and/or other techniques to access workspaces through the workspace access code.

A portion of workspace access code can reside in and be executed on any user device. Also, a portion of the workspace access code can reside in and be executed on any computing platform 751, including in a middleware setting. As shown, a portion of the workspace access code resides in and can be executed on one or more processing elements (e.g., processing element $703_1$). The workspace access code can interface with storage devices such the shown network storage 755. Storage of workspaces and/or any constituent files or objects, and/or any other code or scripts or data can be stored in any one or more storage partitions (e.g., storage partition $704_1$). In some environments, a processing element includes forms of storage such as RAM and/or ROM and/or FLASH, and/or other forms of volatile and non-volatile storage.

A stored workspace can be populated via an upload (e.g., an upload from client devices to a processing element over an upload network path 757). A stored workspace can be delivered to a particular user and/or shared with other particular users via a download (e.g., a download from a processing element to a user device over a download network path 759).

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method comprising:

identifying a server in a cloud-based environment, wherein the server stores an object that is accessible to one or more users;

receiving a first request to access the object, wherein the first request is associated with a request attribute that pertains to a first user;

receiving a second request to access the object, wherein the second request is associated with the request attribute that pertains to a second user;

creating a first version of the object for the first user and a second version of the object for the second user, the first version and the second version are different versions of the object, wherein the first version of the object for the first user comprises a first text transformation at a first location of the object and the second version of the object for the second user comprises a second text transformation at a second location of the object, wherein the first text transformation comprises a different set of word transformations than the second text transformation, and wherein the first location and the second location are different in respective versions of the object for respective users for identifying the respective users, the different versions of the object are created by:

generating a protected object comprising a steganographic message by applying a steganographic message generation technique that modifies text content of the object by inserting new text content or replacing existing text content with the new text content into different locations of the object, wherein variations in the new text content in combination with the different locations for placing the new text content are selected based at least in part on the request attribute of a requesting user, the steganographic message comprising a text transformation to the object that is perceptible to the requesting user, wherein the text transformation is associated to the requesting user, wherein the text transformation being associated to the requesting user assists in identifying the requesting user as a source of disclosure of the protected object; and providing access to the first version of the object to the first user and the second version of the object to the second user.

2. The method of claim 1, further comprising storing a watermarking log entry, wherein the watermarking log entry comprises an association between the request attribute and the protected object.

3. The method of claim 1, wherein the object comprises text fragments having two or more variations, the two or more variations preserving a semantic score within a sensitivity threshold.

4. The method of claim 1, wherein the steganographic message generation technique is determined based at least in part on, a device ID, workspace ID, or a group of collaborators, or any combination thereof.

5. The method of claim 1, wherein the request attribute comprises at least one of, a user identifier, or a file identifier, or a request time, or a request location, or a device identifier, or any combination thereof.

6. The method of claim 1, wherein identifying one or more portions of the object is based at least in part on one of, an object type, or a content type, or an object domain, or a domain segment, or a watermarking rule, or a watermarking threshold, or any combination thereof.

7. The method of claim 6, wherein the watermarking threshold corresponds to a first text transformation metric.

8. The method of claim 1, further comprising:
receiving a disclosed portion of the protected object;
identifying the protected object from the disclosed portion; and
determining the request attribute from the generated steganographic message applied to the protected object.

9. The method of claim 8, wherein identifying the protected object from the disclosed portion is performed by a crawler.

10. The method of claim 8, wherein identifying the protected object further comprises comparing the disclosed portion to a plurality of published protected objects to determine a match similarity distribution.

11. The method of claim 10, wherein the protected object corresponds to one or more highest probabilities in the match similarity distribution.

12. The method of claim 10, wherein a probability comprising the match similarity distribution corresponds to a second text transformation metric.

13. A computer program product, embodied in a non-transitory computer readable medium, the non-transitory computer readable medium having stored thereon a sequence of instructions which, when stored in a memory and executed by a processor causes the processor to perform a set of acts, the set of acts comprising:
identifying a server in a cloud-based environment, wherein the server stores an object that is accessible to one or more users;
receiving a first request to access the object, wherein the first request is associated with a request attribute that pertains to a first user;
creating a first version of the object for the first user and a second version of the object for the second user, the first version and the second version are different versions of the object, wherein the first version of the object for the first user comprises a first text transformation at a first location of the object and the second version of the object for the second user comprises a second text transformation at a second location of the object, wherein the first text transformation comprises a different set of word transformations than the second text transformation, and wherein the first location and the second location are different in respective versions of the object for respective users for identifying the respective users, the different versions of the object are created by:
generating a protected object comprising a steganographic message by applying a steganographic message generation technique that modifies text content of the object by inserting new text content or replacing existing text content with the new text content into different locations of the object, wherein variations in the new text content in combination with the different locations for placing the new text content are selected based at least in part on the request attribute of a requesting user, the steganographic message comprising a text transformation to the object that is perceptible to the requesting user, wherein the text transformation is associated to the requesting user, wherein the text transformation being associated to the requesting user assists in identifying the requesting user as a source of disclosure of the protected object; and
providing access to the first version of the object to the first user and the second version of the object to the second user.

14. The computer program product of claim 13, further comprising instructions which, when stored in the memory and executed by the processor causes the processor to perform a set of acts comprising:
receiving a disclosed portion of the protected object;
identifying the protected object from the disclosed portion; and
determining the request attribute from the generated steganographic message applied to the protected object.

15. The computer program product of claim 14, wherein identifying the protected object from the disclosed portion is performed by a crawler.

16. The computer program product of claim 14, wherein identifying the protected object further comprises comparing the disclosed portion to a plurality of published protected objects to determine a match similarity distribution.

17. A system comprising:
a non-transitory storage medium having stored thereon a sequence of instructions;
a processor or processors that execute the sequence of instructions to cause the processor or processors to perform a set of acts, the set of acts comprising:
identifying a server in a cloud-based environment, wherein the server stores an object that is accessible to one or more users,
receiving a first request to access the object, wherein the first request is associated with a request attribute that pertains to a first user, creating a first version of the object for the first user and a second version of the object for the second user, the first version and the second version are different versions of the object, wherein the first version of the object for the first user comprises a first text transformation at a first location of the object and the second version of the object for the second user comprises a second text transformation at a second location of the object, wherein the first text transformation comprises a different set of word transformations than the second text transformation, and wherein the first location and the second location are different in respective versions of the object for respective users for identifying the respective users, the different versions of the object are created by:

generating a protected object comprising a steganographic message by applying a steganographic message generation technique that modifies text content of the object by inserting new text content or replacing existing text content with the new text content into different locations of the object, wherein variations in the new text content in combination with the different locations for placing the new text content are selected based at least in part on the request attribute of a requesting user, the steganographic message comprising a text transformation to the object that is perceptible to the requesting user, wherein the text transformation is associated to the requesting user, wherein the text transformation being associated to the requesting user assists in identifying the requesting user as a source of disclosure of the protected object; and a network path to provide access to the first version of the object to the first user and the second version of the object to the second user.

18. The system of claim 17, further comprising a storage device to store a watermarking log entry, wherein the watermarking log entry comprises an association between the request attribute and the protected object.

19. The system of claim 17, wherein the object comprises text fragments having two or more variations, the two or more variations preserving a semantic score within a sensitivity threshold.

\* \* \* \* \*